US011138905B2

(12) United States Patent
Hoss et al.

(10) Patent No.: US 11,138,905 B2
(45) Date of Patent: *Oct. 5, 2021

(54) AUTOMATED EXTERNAL DEFIBRILLATOR (AED) TRAINER

(71) Applicant: Physio-Control, Inc., Redmond, WA (US)

(72) Inventors: Jennifer E. Hoss, Seattle, WA (US); Karl F. Gauglitz, Snohomish, WA (US); Denise Norman, Woodinville, WA (US)

(73) Assignee: Physio-Control, Inc., Redmond, WA (US)

( * ) Notice: Subject to any disclaimer, the term of this patent is extended or adjusted under 35 U.S.C. 154(b) by 310 days.

This patent is subject to a terminal disclaimer.

(21) Appl. No.: 16/460,197

(22) Filed: Jul. 2, 2019

(65) Prior Publication Data

US 2019/0392734 A1  Dec. 26, 2019

Related U.S. Application Data

(63) Continuation of application No. 15/362,620, filed on Nov. 28, 2016, now Pat. No. 10,373,526.

(60) Provisional application No. 62/267,841, filed on Dec. 15, 2015.

(51) Int. Cl.
  *G09B 23/28* (2006.01)
  *G09B 23/30* (2006.01)
  *G09B 5/04* (2006.01)

(52) U.S. Cl.
  CPC .......... *G09B 23/288* (2013.01); *G09B 5/04* (2013.01); *G09B 23/30* (2013.01)

(58) Field of Classification Search
  USPC ........................................... 434/262
  See application file for complete search history.

(56) References Cited

U.S. PATENT DOCUMENTS

| 3,453,745 | A  | 7/1969  | Spivack |
| 5,137,458 | A  | 8/1992  | Ungs et al. |
| 5,275,572 | A  | 1/1994  | Ungs et al. |
| 5,662,690 | A  | 9/1997  | Cole |
| 6,074,213 | A  | 6/2000  | Hon |
| 6,314,320 | B1 | 11/2001 | Powers et al. |
| 6,336,047 | B1 | 1/2002  | Thu et al. |

(Continued)

FOREIGN PATENT DOCUMENTS

| WO | 2005/078682 A1 | 8/2005 |
| WO | 2012/127340 A1 | 9/2012 |
| WO | 2016/177591 A1 | 11/2016 |

OTHER PUBLICATIONS

Non-Final Office Action received for U.S. Appl. No. 5/362,620, dated Jul. 10, 2018, 10 pages.

(Continued)

*Primary Examiner* — Masud Ahmed
(74) *Attorney, Agent, or Firm* — McDonnell Boehnen Hulbert & Berghoff LLP

(57) ABSTRACT

An AED trainer is implemented using a special purpose hardware platform and a state machine, implemented in software, which together replicate or simulate operations of a target AED device. The state machine operates the AED trainer in an efficient and effective manner to train students to correctly perform rescue procedures on patients suffering from Sudden Cardiac Arrest.

20 Claims, 31 Drawing Sheets

(56) References Cited

U.S. PATENT DOCUMENTS

| | | | |
|---|---|---|---|
| 6,356,785 B1 | 3/2002 | Snyder et al. | |
| 6,611,708 B1 | 8/2003 | Morgan et al. | |
| 6,872,080 B2 * | 3/2005 | Pastrick | G09B 23/288 |
| | | | 434/262 |
| 7,114,954 B2 * | 10/2006 | Eggert | G09B 23/30 |
| | | | 434/262 |
| 8,323,029 B2 | 12/2012 | Toly | |
| 8,335,562 B2 | 12/2012 | Hansen et al. | |
| 8,696,362 B2 * | 4/2014 | Eggert | G09B 23/30 |
| | | | 434/266 |
| 2004/0214148 A1 * | 10/2004 | Salvino | A61N 1/3904 |
| | | | 434/262 |
| 2006/0167564 A1 * | 7/2006 | Flaherty | G06F 3/014 |
| | | | 623/57 |
| 2008/0131855 A1 * | 6/2008 | Eggert | G09B 23/30 |
| | | | 434/266 |
| 2011/0098674 A1 * | 4/2011 | Vicente | G16H 20/17 |
| | | | 604/504 |
| 2014/0004494 A1 | 1/2014 | Griesser et al. | |
| 2014/0093853 A1 | 4/2014 | Constantine, III | |
| 2014/0099618 A1 | 4/2014 | Yang et al. | |
| 2016/0098935 A1 | 4/2016 | Duval-Arnould et al. | |
| 2017/0076634 A1 | 3/2017 | Hoss et al. | |

OTHER PUBLICATIONS

Final Office Action received for U.S. Appl. No. 5/362,620, dated Jan. 7, 2019, 10 Pages.

Notice of Allowance received for U.S. Appl. No. 15/362,620, dated Mar. 14, 2019, 5 pages.

* cited by examiner

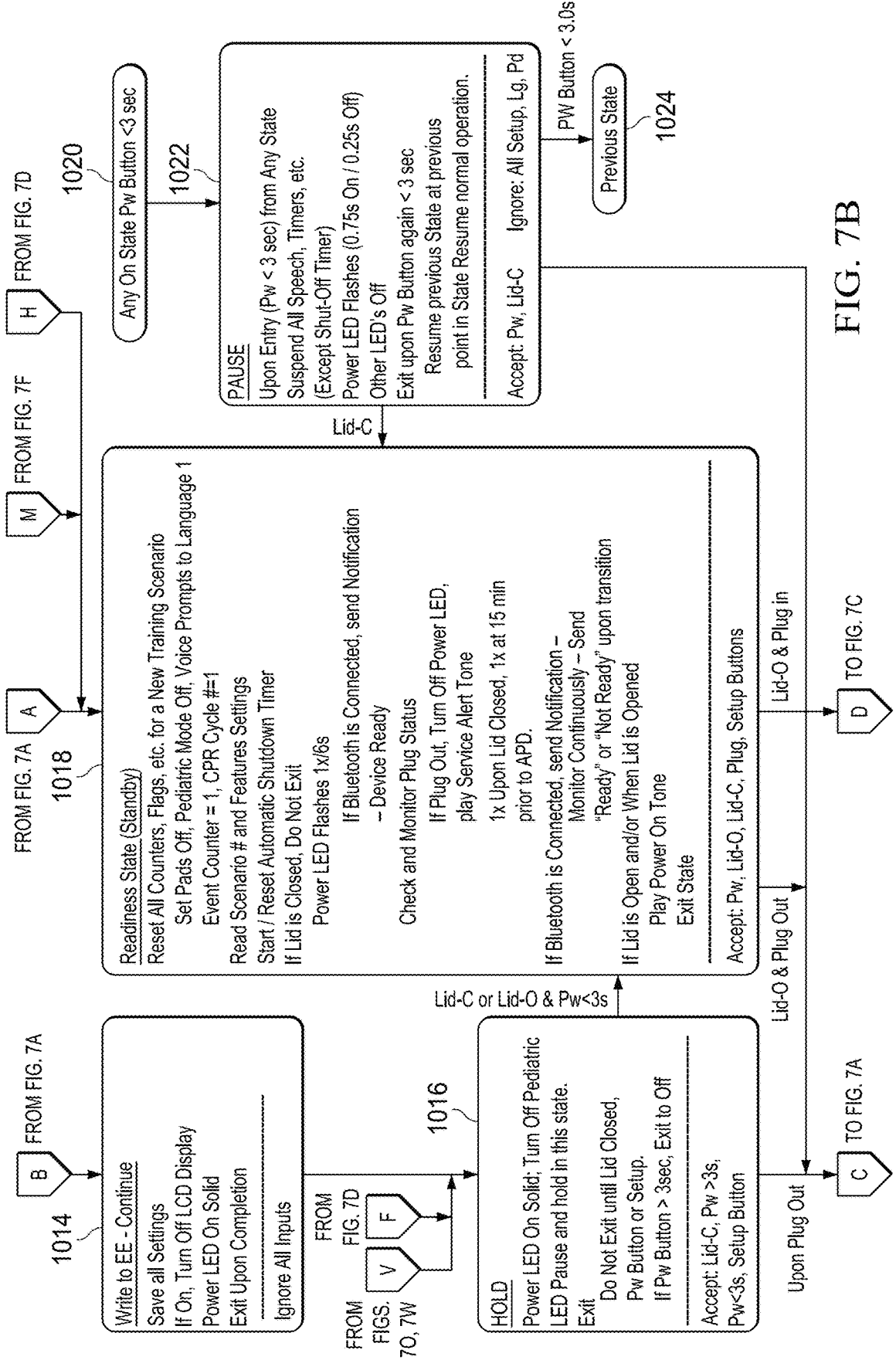

- YOU HAVE ONE MINUTE TO GO
@T = 80 sec
- LEAN OVER THE PATIENT + TOCKS(2)
- KEEP ELBOWS STRAIGHT + TOCKS(2)
- USE BODY WEIGHT TO PUSH
@T = 100 sec
- PUSH DOWN HARD AT LEAST 2 INCHES
@T = 120 sec
Exit State
If CPR Time = 180s
@T = 60 sec
- LEAN OVER THE PATIENT + TOCKS(2)
- KEEP ELBOWS STRAIGHT + TOCKS(2)
- USE BODY WEIGHT TO PUSH
@T = 80 sec
- PUSH DOWN HARD AT LEAST 2 INCHES
@T = 100 sec
- REMEMBER TO PUSH HARD
@T = 120 sec
- YOU HAVE ONE MINUTE TO GO
@T = 140 sec
- PUSH DOWN HARD AT LEAST 2 INCHES
@T = 160 sec
- REMEMBER TO PUSH HARD
@T = 180 sec
Exit State
Exit All Upon Completion
Accept: Pw, Setup, Lid-C

1088

@T = 60 sec
- YOU HAVE ONE MINUTE TO GO
@T = 80 sec
- REMEMBER TO PUSH HARD
@T = 100 sec
- PUSH DOWN HARD AT LEAST 2 INCHES
@T = 120 sec
Exit State
If CPR Period = 180s
@T = 60 sec
- REMEMBER TO PUSH HARD
@T = 80 sec
- PUSH DOWN HARD AT LEAST 2 INCHES
@T = 100 sec
- REMEMBER TO PUSH HARD
@T = 120 sec
- YOU HAVE ONE MINUTE TO GO
@T = 140 sec
- PUSH DOWN HARD AT LEAST 2 INCHES
@T = 160 sec
- REMEMBER TO PUSH HARD
@T = 180 sec
Exit State
Exit All Upon Completion
Accept: Pw, Setup, Lid-C

FROM FIG. 7I

FROM FIG. 7P  1136

Pediatric CPR: NO CPR Detected, NO Ventilations, 1st Cycle Only
- PROVIDE CHEST COMPRESSIONS TO THE BEAT
- (1 sec pause)
Start Metronome Tocks & CPR Timer at T=0
Tocks are continuous at 104/min within and between all prompts. (Low volume Tocks within prompts)
Exact @T Prompt times will be Synced to nearest Tock
@T = 0 sec
- THE HEEL OF ONE HAND SHOULD BE IN CENTER OF CHEST; THE OTHER HAND SHOULD BE ON TOP OF THE FIRST HAND + TOCKS(2)
- PUSH DOWN DEEP
@T = 20 sec
- REMEMBER TO PUSH DEEP
Exit State
If CPR Time = Short/60s/120s/180s
@T = 40 sec
- THE HEEL OF ONE HAND SHOULD BE IN CENTER OF CHEST; THE OTHER HAND SHOULD BE ON TOP OF THE FIRST HAND + TOCKS(2)
- PUSH DOWN DEEP
If CPR Time = 60s, OR = Short
@T = 60 sec
Exit State
If CPR Time = 120s FROM FIG. 7P  1138

Pediatric CPR: NO Ventilations, 1st Cycle Only
- PROVIDE CHEST COMPRESSIONS TO THE BEAT
- (1 sec pause)
Start Metronome Tocks & CPR Timer at T=0
Tocks are continuous at 104/min within and between all prompts. (Low volume Tocks within prompts)
Exact @T Prompt times will be Synced to nearest Tock
@T = 0 sec
- THE HEEL OF ONE HAND SHOULD BE IN CENTER OF CHEST; THE OTHER HAND SHOULD BE ON TOP OF THE FIRST HAND + TOCKS(2)
- PUSH DOWN DEEP
@T = 20 sec
- REMEMBER TO PUSH DEEP
If CPR Time = Short
Exit State after next 5 seconds of Tocks
If CPR Time = 60s/120s/180s
@T = 40 sec
- PUSH DOWN DEEP
If CPR Time = 60s
@T = 60 sec
Exit State
If CPR Time = 120s
- YOU HAVE ONE MINUTE TO GO

Box 1136 (TO FIG. 7W, AI):
- @T = 60 sec
  - YOU HAVE ONE MINUTE TO GO
- @T = 80 sec
  - REMEMBER TO PUSH DEEP
- @T = 100 sec
  - PUSH DOWN DEEP
- @T = 120 sec
  - Exit State
  - If CPR Time = 180s
- @T = 60 sec
  - REMEMBER TO PUSH DEEP
- @T = 80 sec
  - PUSH DOWN DEEP
- @T = 100 sec
  - REMEMBER TO PUSH DEEP
- @T = 120 sec
  - YOU HAVE ONE MINUTE TO GO
- @T = 140 sec
  - PUSH DOWN DEEP
- @T = 160 sec
  - REMEMBER TO PUSH DEEP
- @T = 180 sec
  - Exit State
  - Exit All Upon Completion Accept: Pw, Setup, Lid-C Box 1138 (FROM FIG. 7Q, TO FIG. 7S):
- @T = 80 sec
  - REMEMBER TO PUSH DEEP
- @T=100 sec
  - PUSH DOWN DEEP
- @T = 120 sec
  - Exit State
  - If CPR Time = 180s
- @T = 60 sec
  - REMEMBER TO PUSH DEEP
- @T = 80 sec
  - PUSH DOWN DEEP
- @T = 100 sec
  - REMEMBER TO PUSH DEEP
- @T = 120 sec
  - YOU HAVE ONE MINUTE TO GO
- @T = 140 sec
  - PUSH DOWN DEEP
- @T = 160 sec
  - REMEMBER TO PUSH DEEP
- @T = 180 sec
  - Exit State
  - Exit All Upon Completion Accept: Pw, Setup, Lid-C

AUTOMATED EXTERNAL DEFIBRILLATOR (AED) TRAINER

CROSS REFERENCE TO RELATED APPLICATIONS

This application is a continuation of U.S. patent application Ser. No. 15/362,620 filed on Nov. 28, 2016, which claims priority to U.S. Provisional Patent Application No. 62/267,841, entitled "AUTOMATED EXTERNAL DEFIBRILLATOR (AED) TRAINER," filed Dec. 15, 2015, which are hereby incorporated by reference in their entirety.

TECHNICAL FIELD

The present invention pertains generally to technology-based methods and systems for training users to operate an automatic external defibrillator (AED) and to perform cardiopulmonary resuscitation (CPR).

BACKGROUND

Automated External Defibrillators (AEDs) have been available for public use and have proven effective at treating Sudden Cardiac Arrest (SCA), a leading cause of death in the U.S. Untreated SCA can result in death in a very short time, and survival rates for SCA decline by about 10% for every minute defibrillation treatment is delayed. AEDs are increasingly being deployed into environments where a minimally-trained or untrained user is likely to be the first responder. Therefore, it is important for witnesses or bystanders to be able to apply defibrillation treatment as quickly as possible, whenever a defibrillator is available. For example, successful defibrillation requires the rescuer to perform a specific sequence of steps in order for the AED to function properly. The rescuer should activate the AED, remove interfering clothing from the victim's torso, successfully apply the defibrillation electrode pads in their proper locations on the torso, and cause the defibrillation shock to be delivered in order to defibrillate the heart. The victim's chance of survival can depend upon the speed at which these steps are completed.

Cardiopulmonary resuscitation (CPR) is an emergency lifesaving procedure that is done when someone's breathing or heartbeat has stopped, and is often performed concurrent with AED use. CPR combines rescue breathing and chest compressions to keep oxygenated blood flowing to the brain during cardiac arrest. The effectiveness of CPR is highly dependent on the proficiency of the rescuer's application, and detailed step-by-step CPR procedures have been established. Many people receive CPR training each year but even trained rescuers may find it difficult to recall these procedures, especially during high stress rescue situations and as standards evolve.

The problems of minimal training, high levels of stress accompanied by noise and confusion, and a very limited time in which to effect a rescue negatively affects the chances of a successful rescue. To keep the rescuer on track during the stress of a rescue, many AEDs guide the user through the defibrillation process with audible or visual prompts. On the other hand, such prompting features may be insufficient in cases where the rescuer lacks any training and in noisy or chaotic environments.

Thus, there is a need for an improved method and system for training users to quickly and correctly perform an emergency rescue procedure using an AED and CPR.

SUMMARY

The present invention provides an Automated External Defibrillator (AED) trainer specially configured to replicate and simulate a corresponding model of an AED. According to an illustrative implementation of the invention, a method for training a student to perform an emergency rescue procedure comprises providing an automatic external defibrillator (AED) trainer to the student. The AED trainer comprises a special purpose hardware platform and state machine, which together simulate the appearance and operations of a target AED. The AED trainer is used to instruct the student, using synthesized voice prompts, in performing a simulated rescue procedure on a manikin. The simulated rescue procedure may include applying simulated cardiopulmonary resuscitation (CPR) and shocks to the manikin.

The inventive method may also include providing a user interface element enabling selection of a language for the voice prompts. In addition, the inventive method may include providing a user interface element enabling selection of a primary and a secondary language for the voice prompts; providing a user interface element enabling selection an adult mode and a child mode of operation; providing guidance for CPR in the form of audible prompts; performing simulated analysis during periods of simulated charging and chest compressions; providing voice prompts to encourage the student to perform simulated checks for breathing, airway obstructions, and blood circulation; pausing the simulated voice prompts upon detecting that the student has pressed a power button of the apparatus for less than a predetermined length of time; and/or detecting simulated CPR performance, and providing real time synthesized voice feedback if no CPR is detected, or if incorrect CPR performance is detected, including incorrect rate, depth and recoil. The trainer may also simulate a shorter CPR pause time when a shock is advised, and simulate no CPR pause time for analysis when no shock is advised.

Additional inventive features are described below.

DETAILED DESCRIPTION OF ILLUSTRATIVE EMBODIMENTS

We will now describe an illustrative embodiment of an AED trainer in accordance with the present invention. First, we provide an overview of the apparatus making up an illustrative embodiment of the AED trainer as well as a state machine within the trainer for carrying out operating procedures for training students in the proper use of an AED. We then describe additional details of an exemplary embodiment of a special purpose machine designed for training students in the use of a specific, target AED.

Trainer Apparatus

Figure 1:
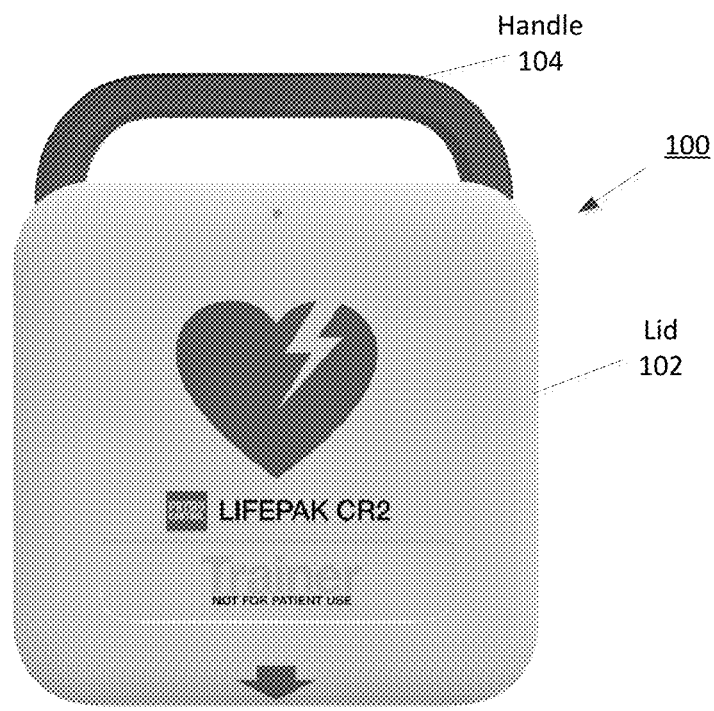
FIG. 1 is a front view of an AED trainer programmed to carry out the methods of the present invention.
Figure 7A:
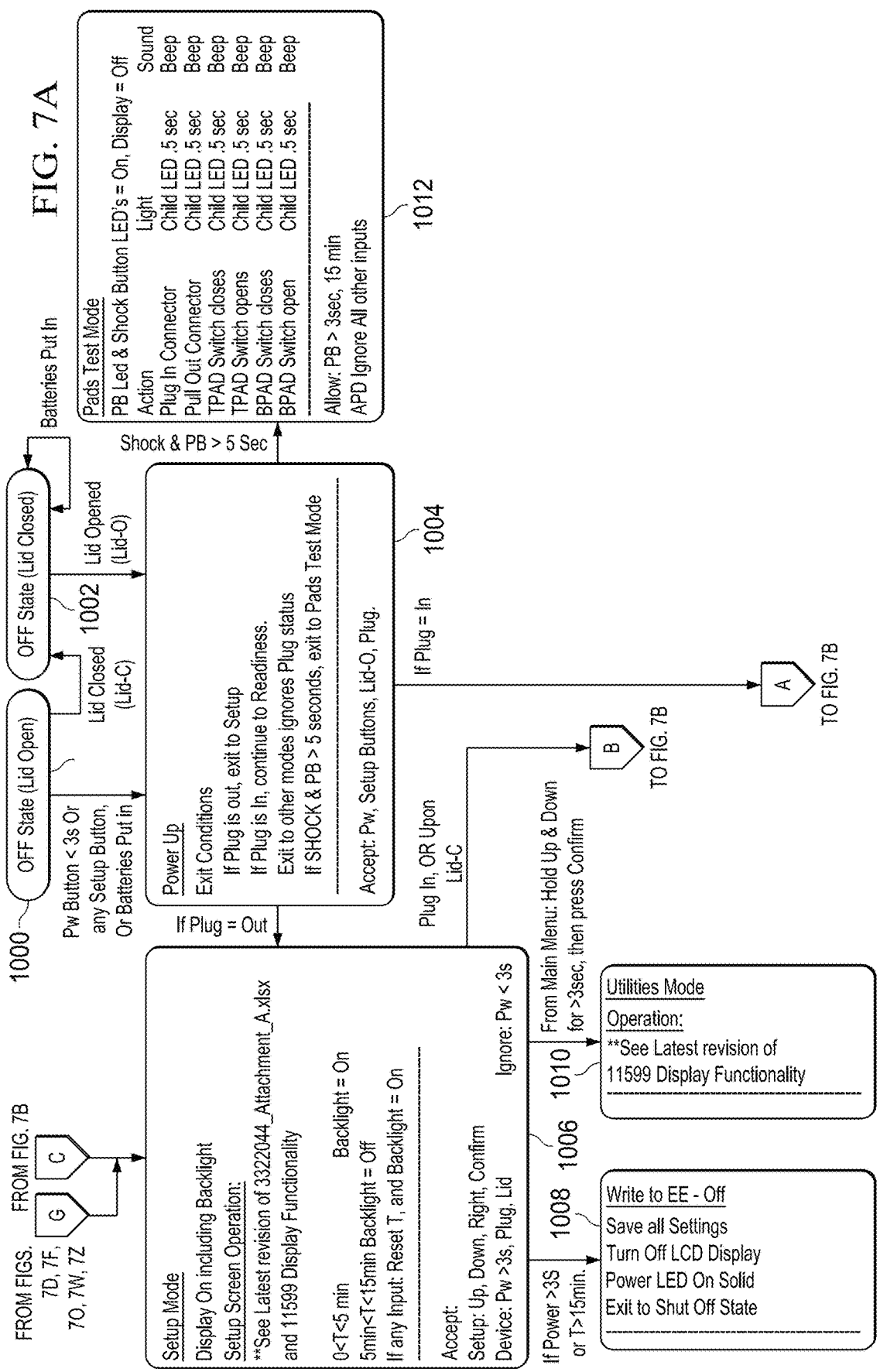
FIGS. 7A-7Z collectively depict a state transition diagram representing an exemplary embodiment of a state machine for controlling operations of the AED training apparatus.
Figure 7C:
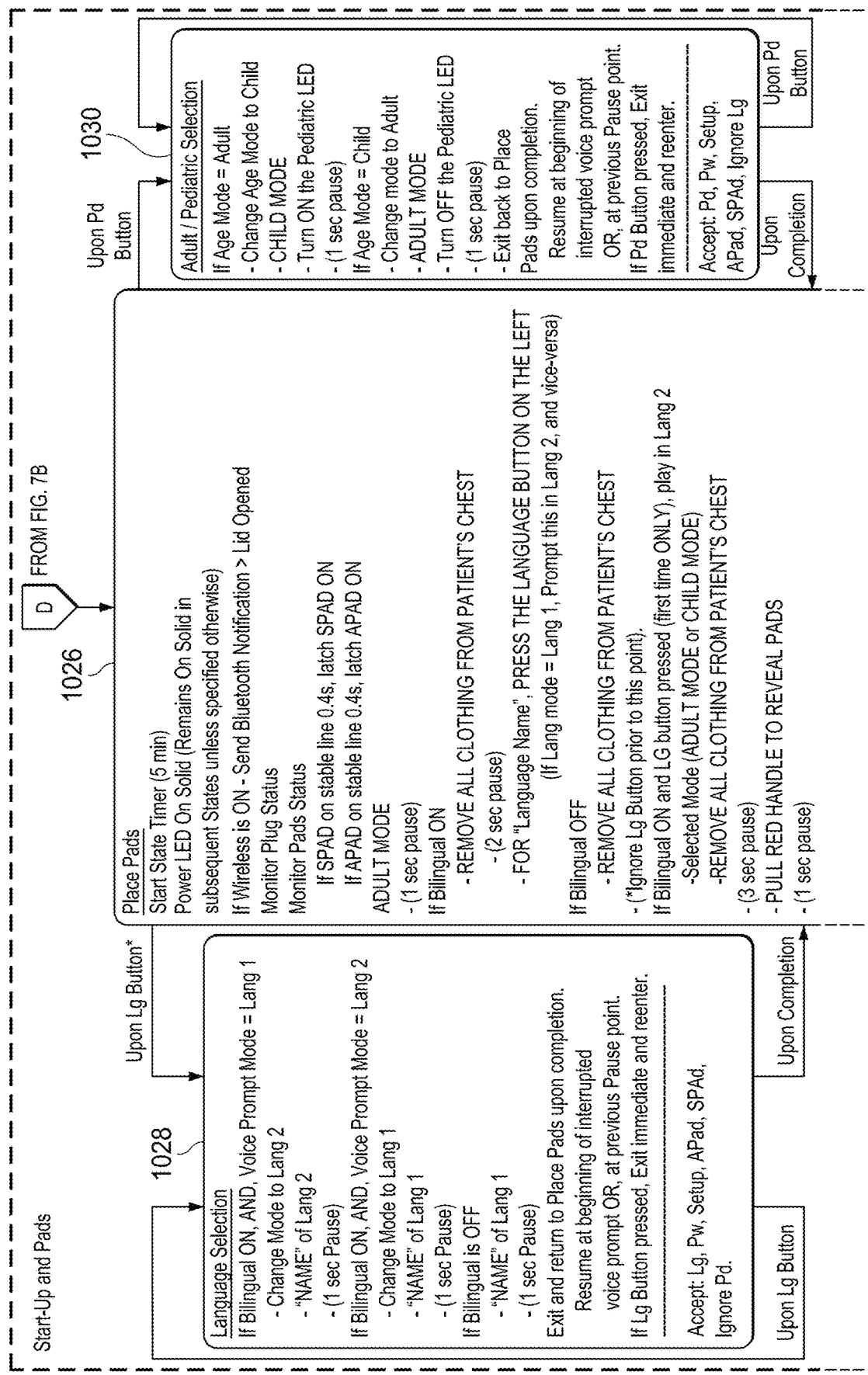
Figure 7D:
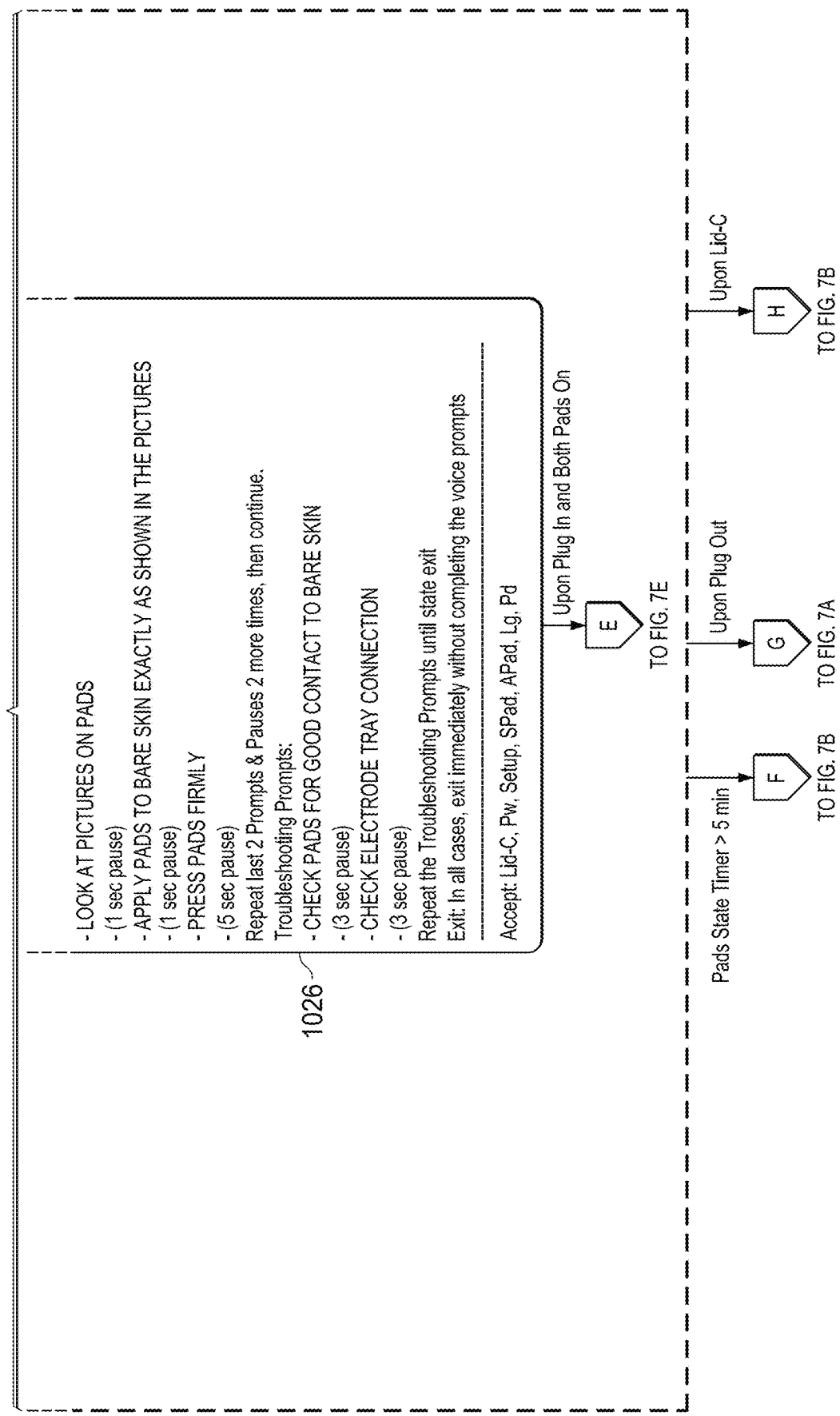
Figure 7E:
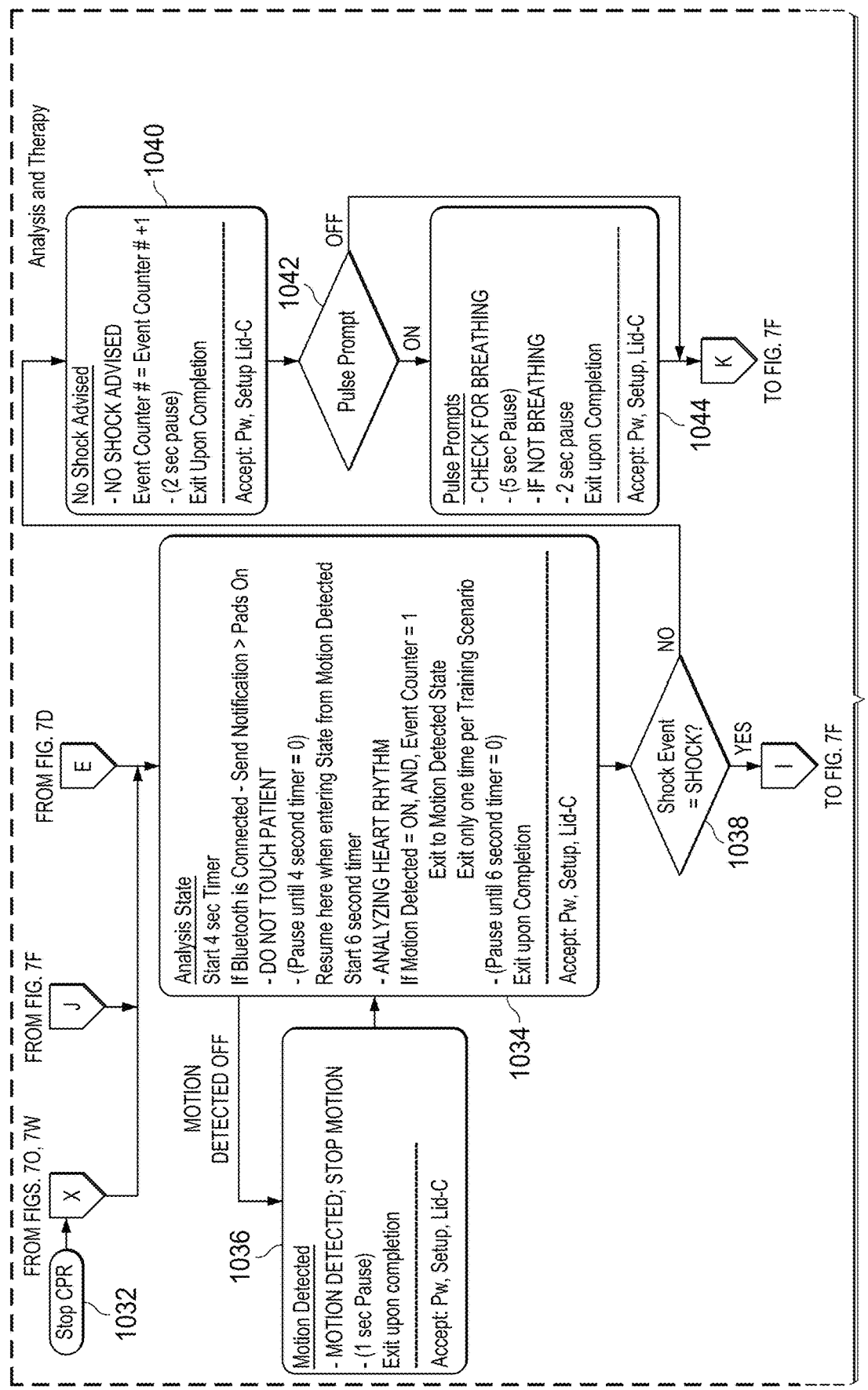
Figure 7F:
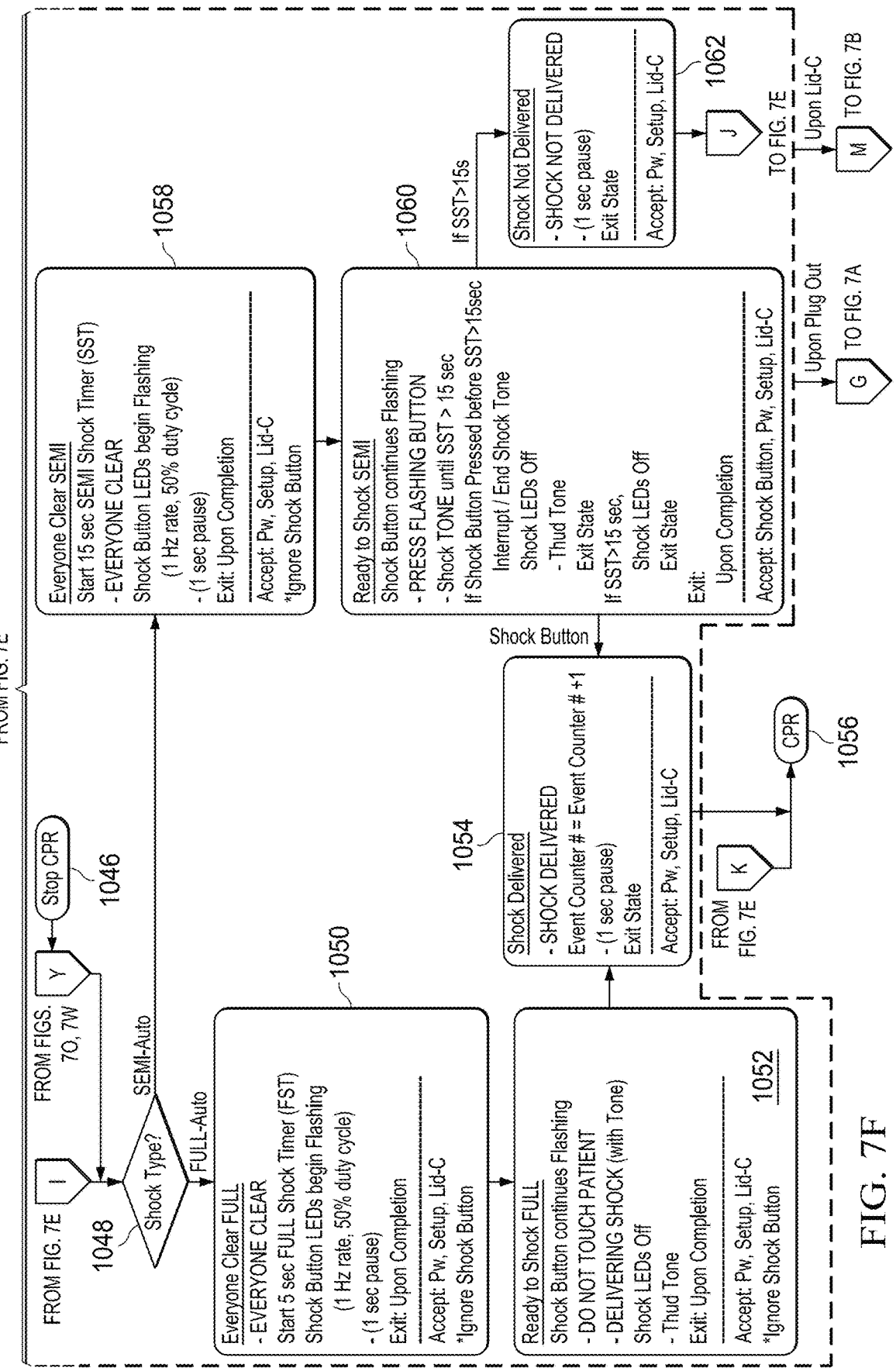
Figure 7G:
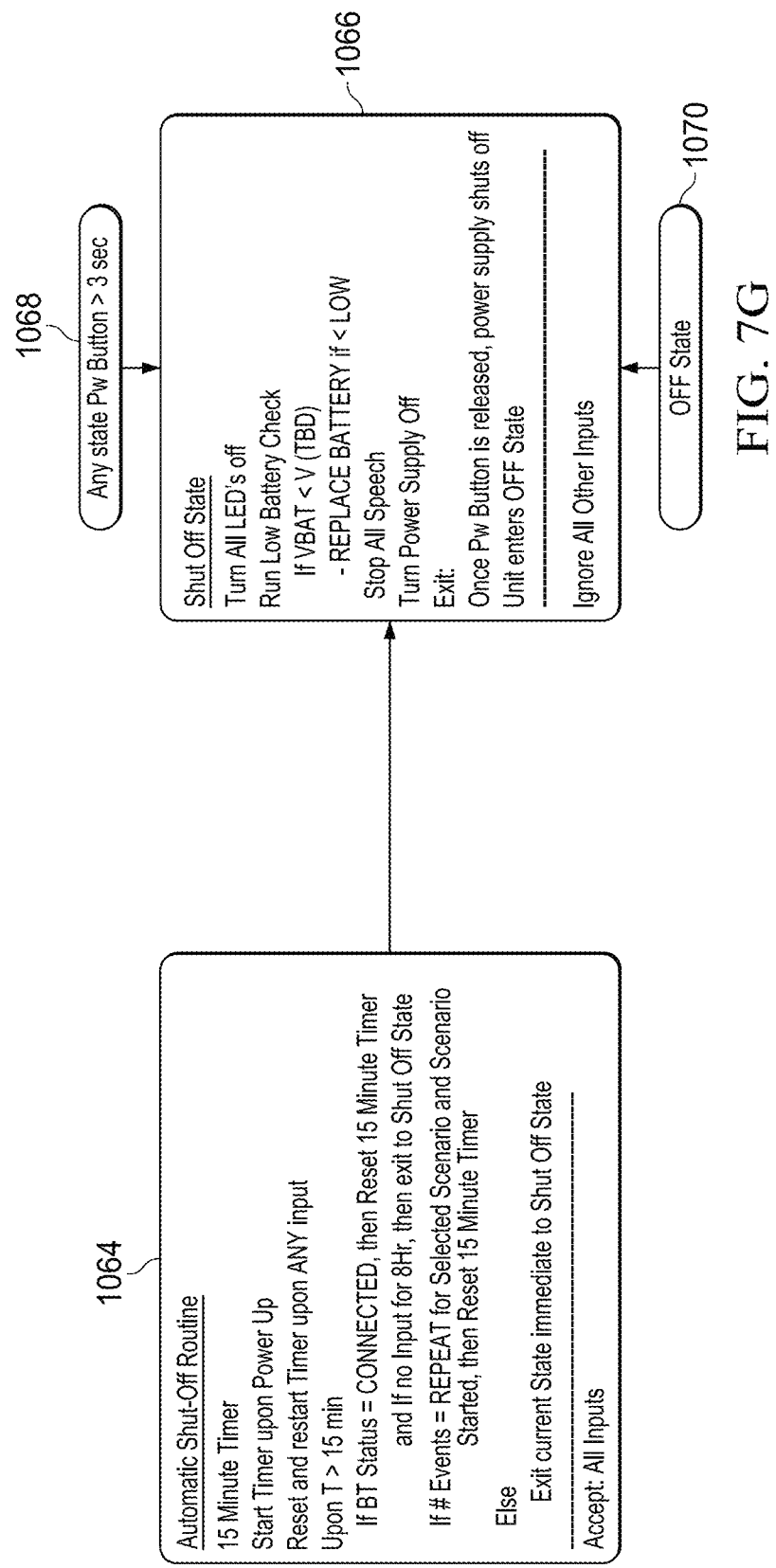
Figure 7H:
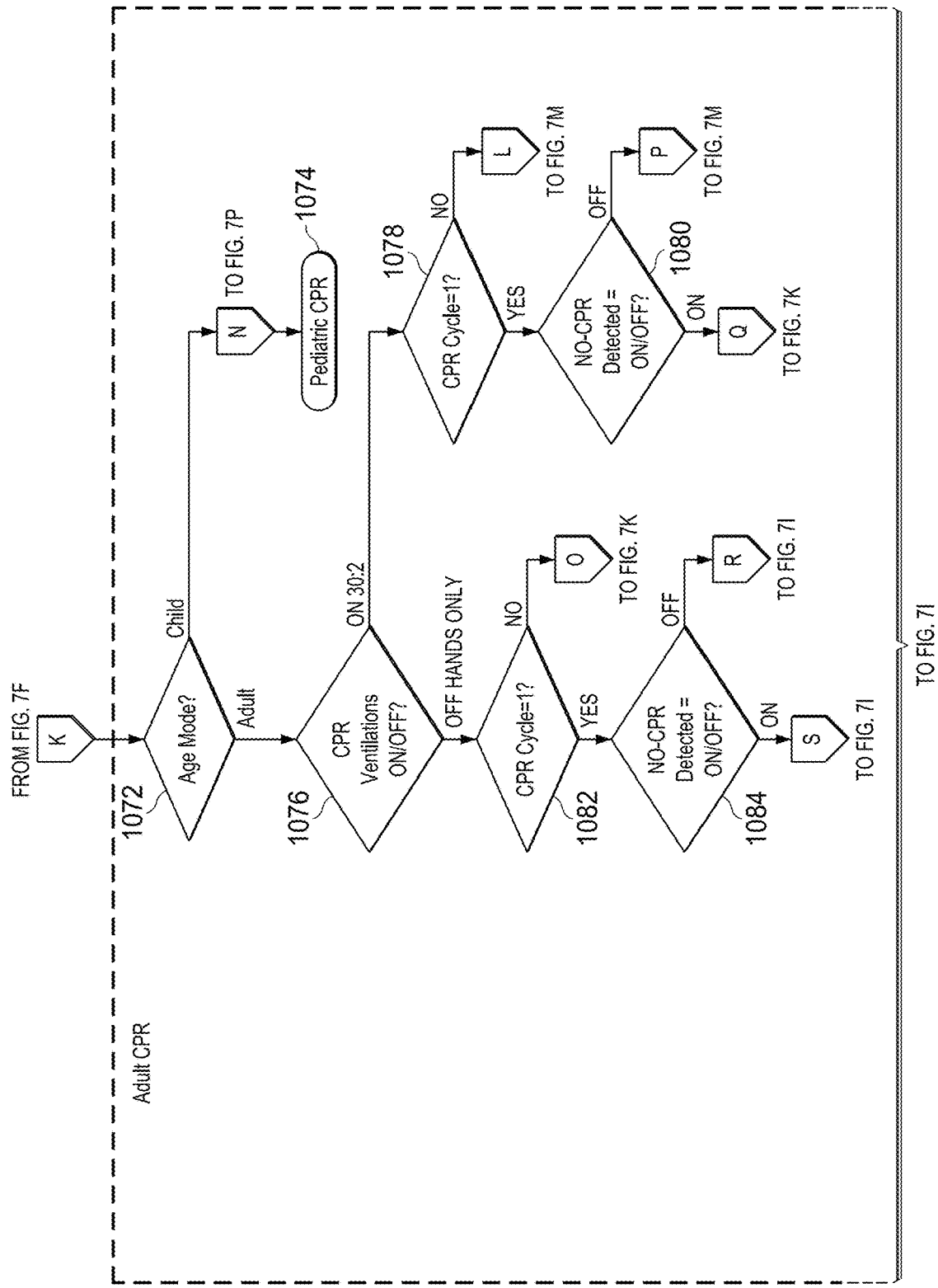
Figure 7I:
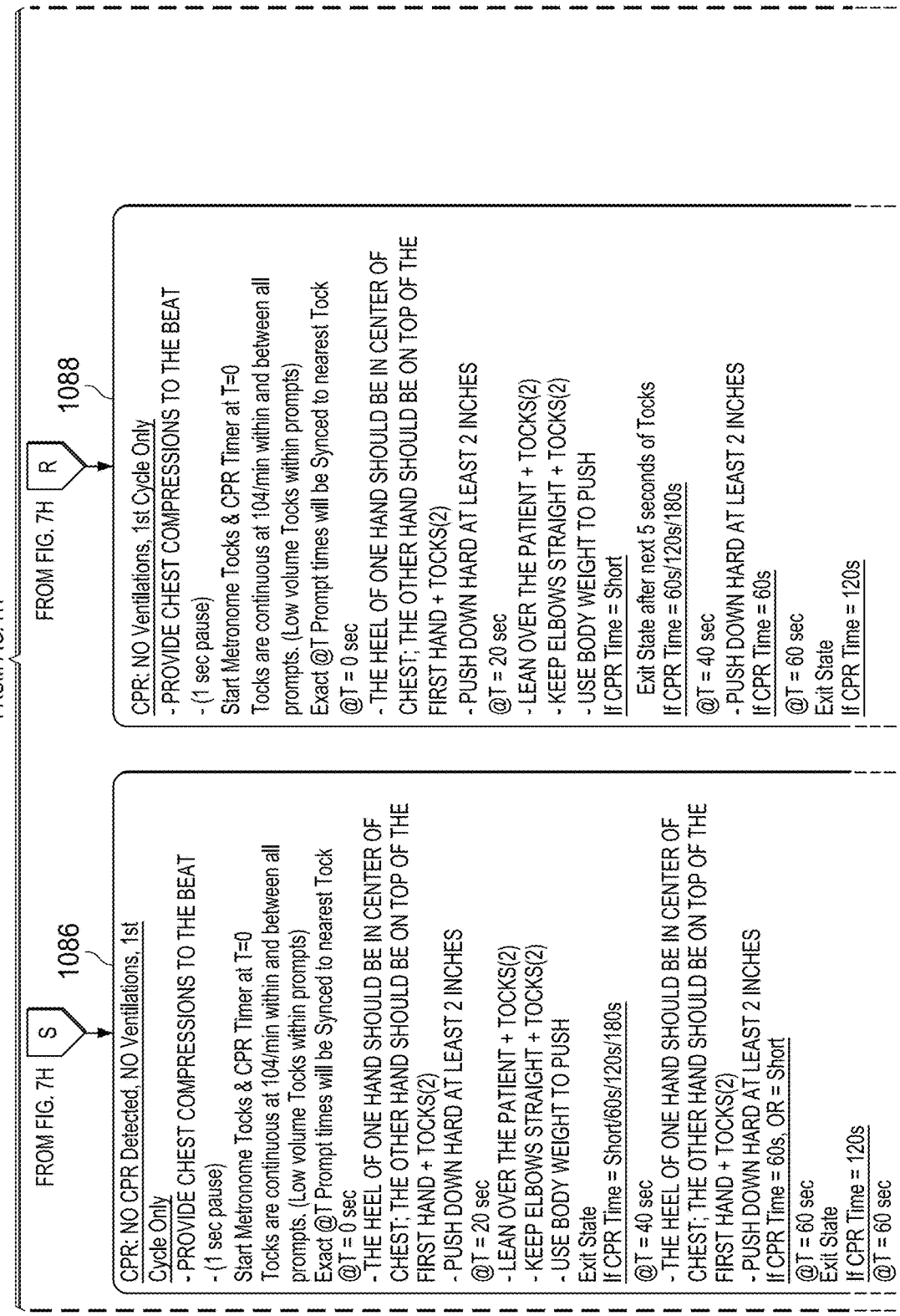
Figure 7K:
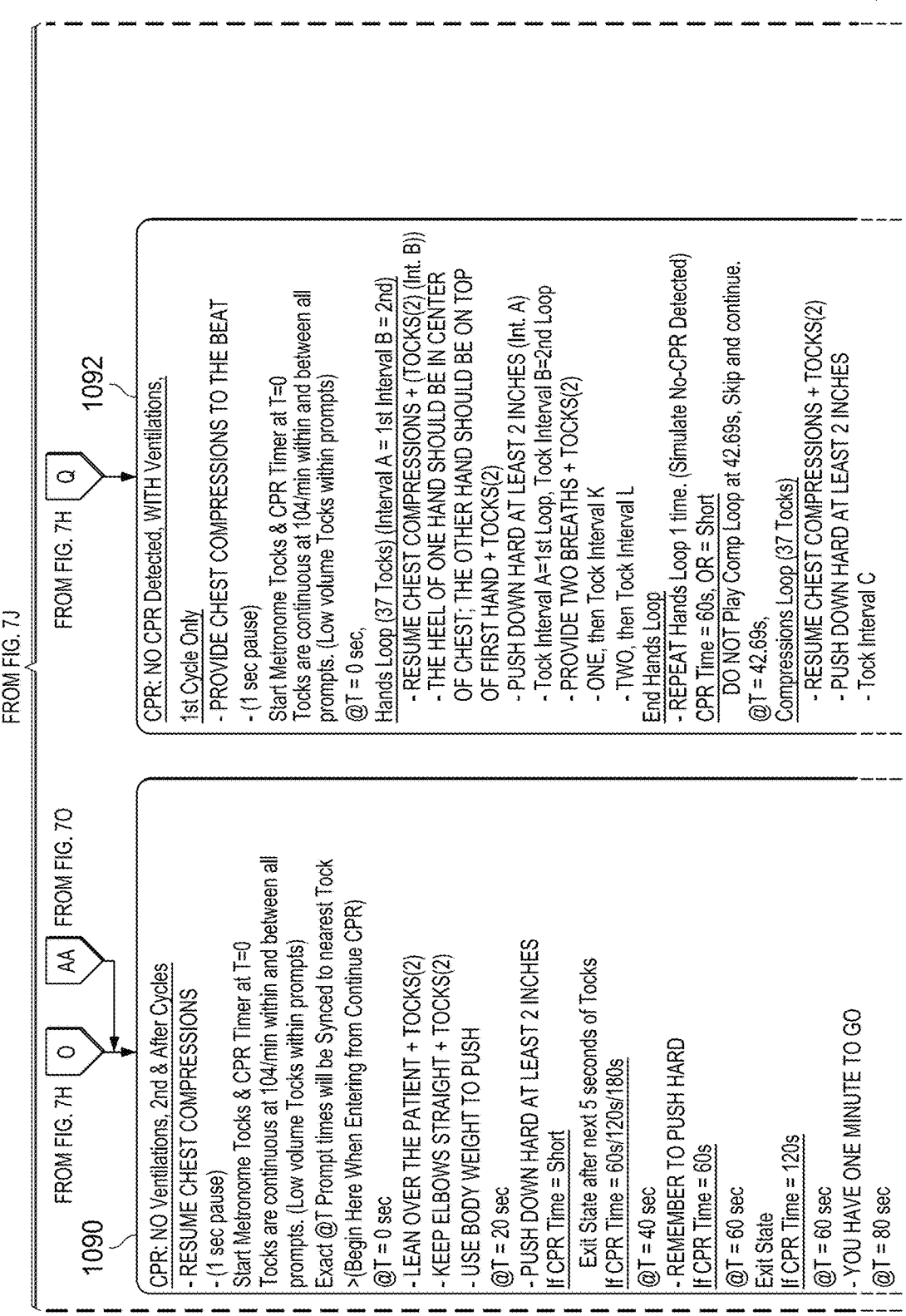
Figure 7L:
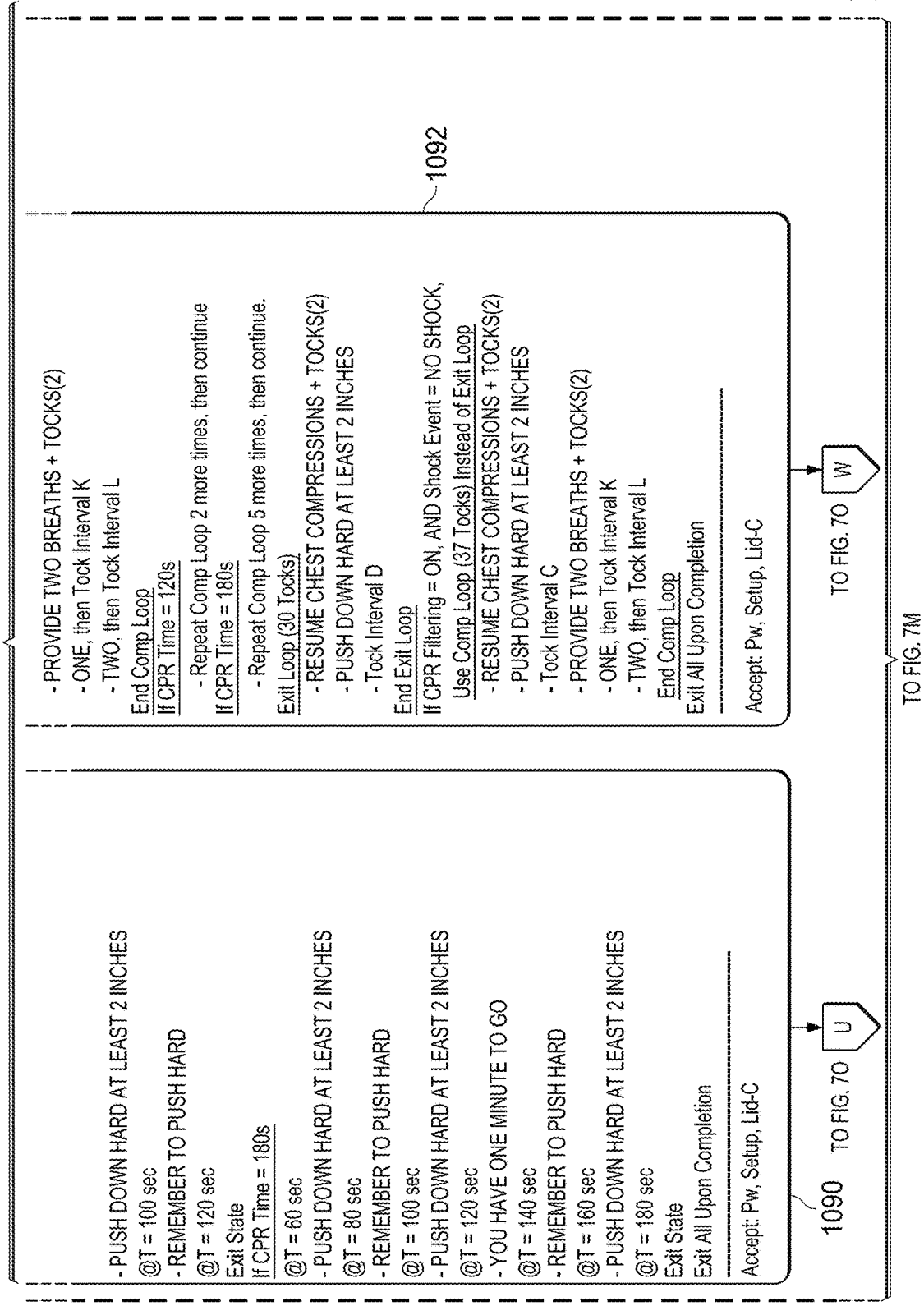
Figure 7M:
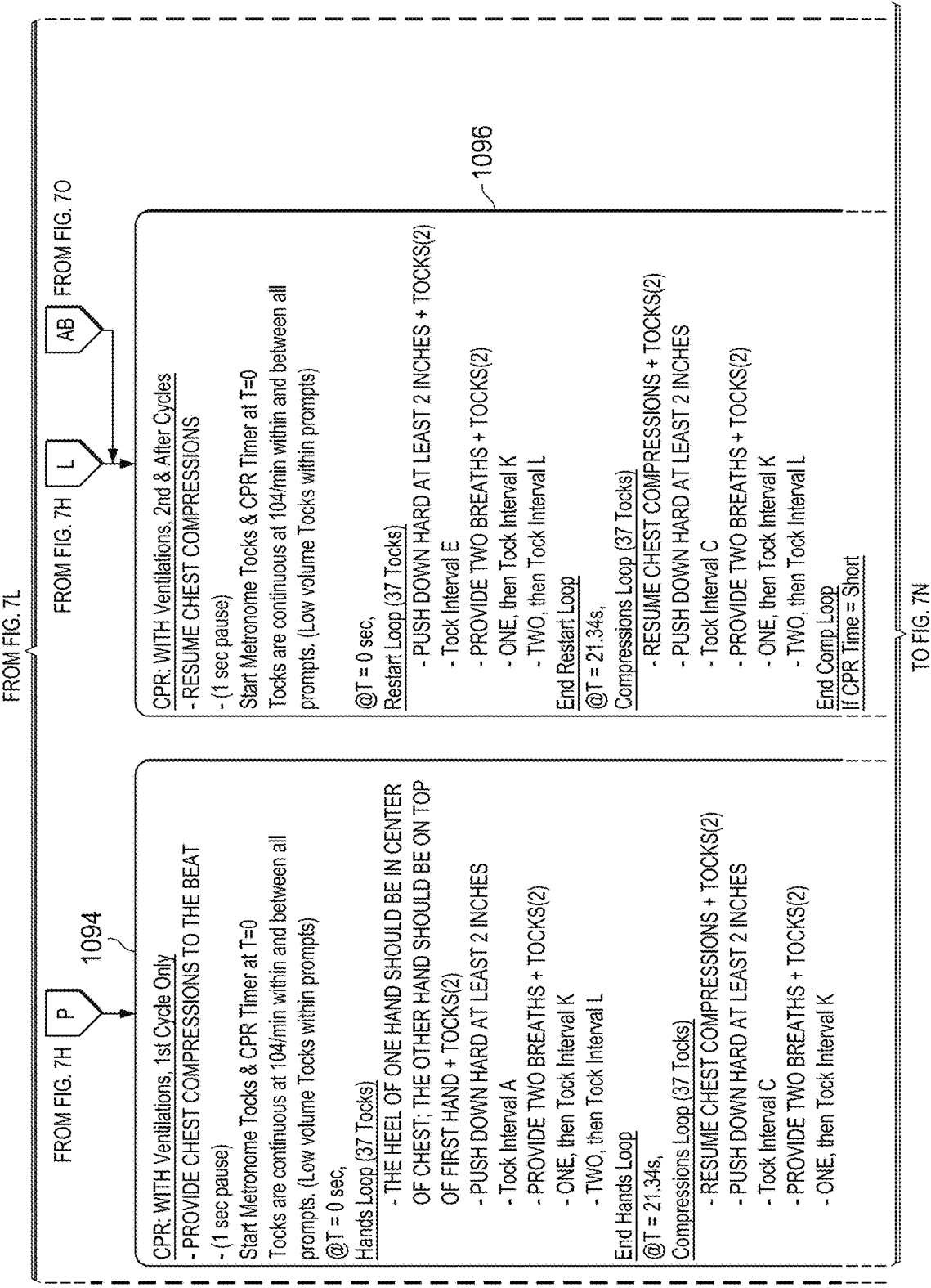
Figure 7N:
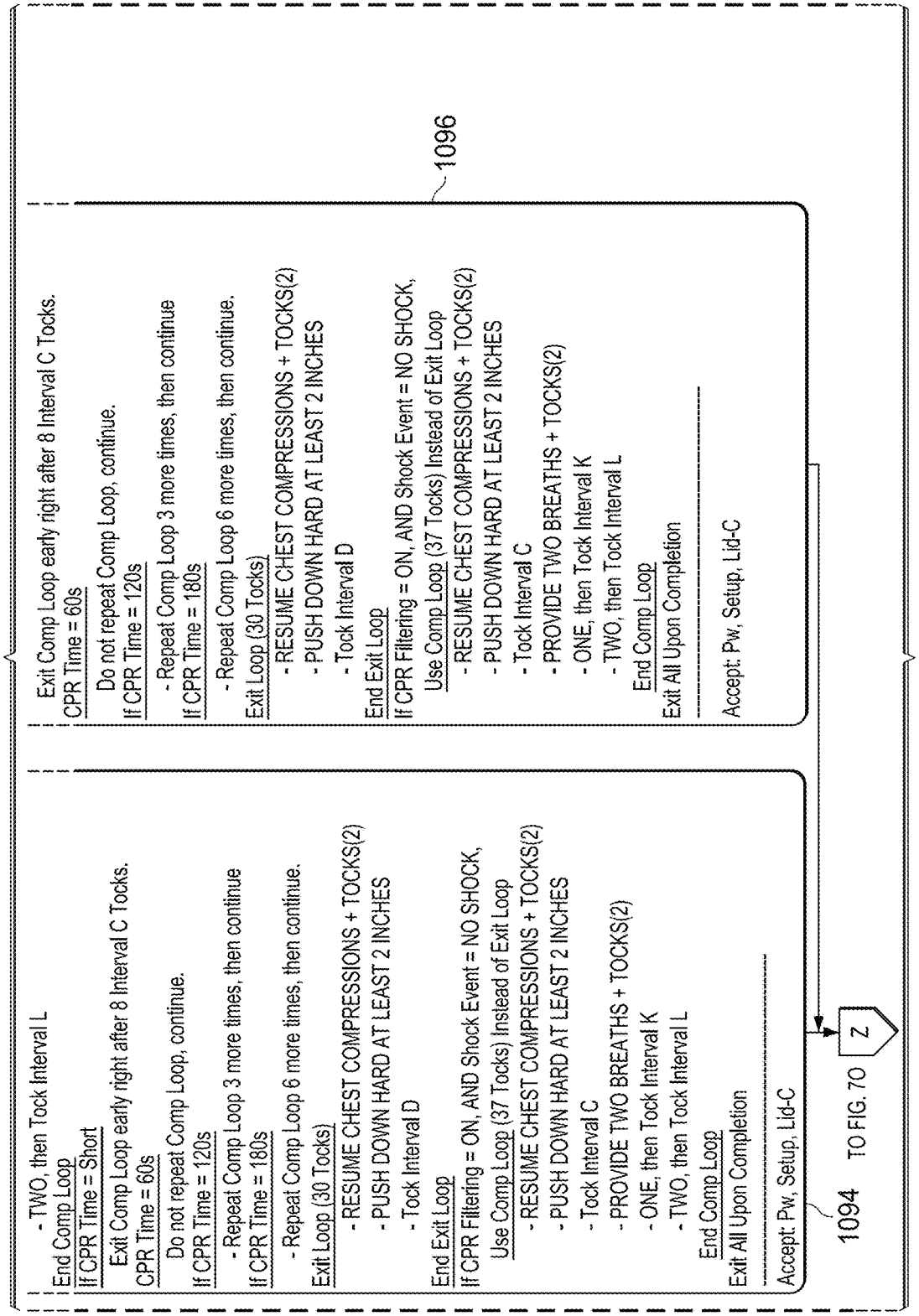
Figure 7O:
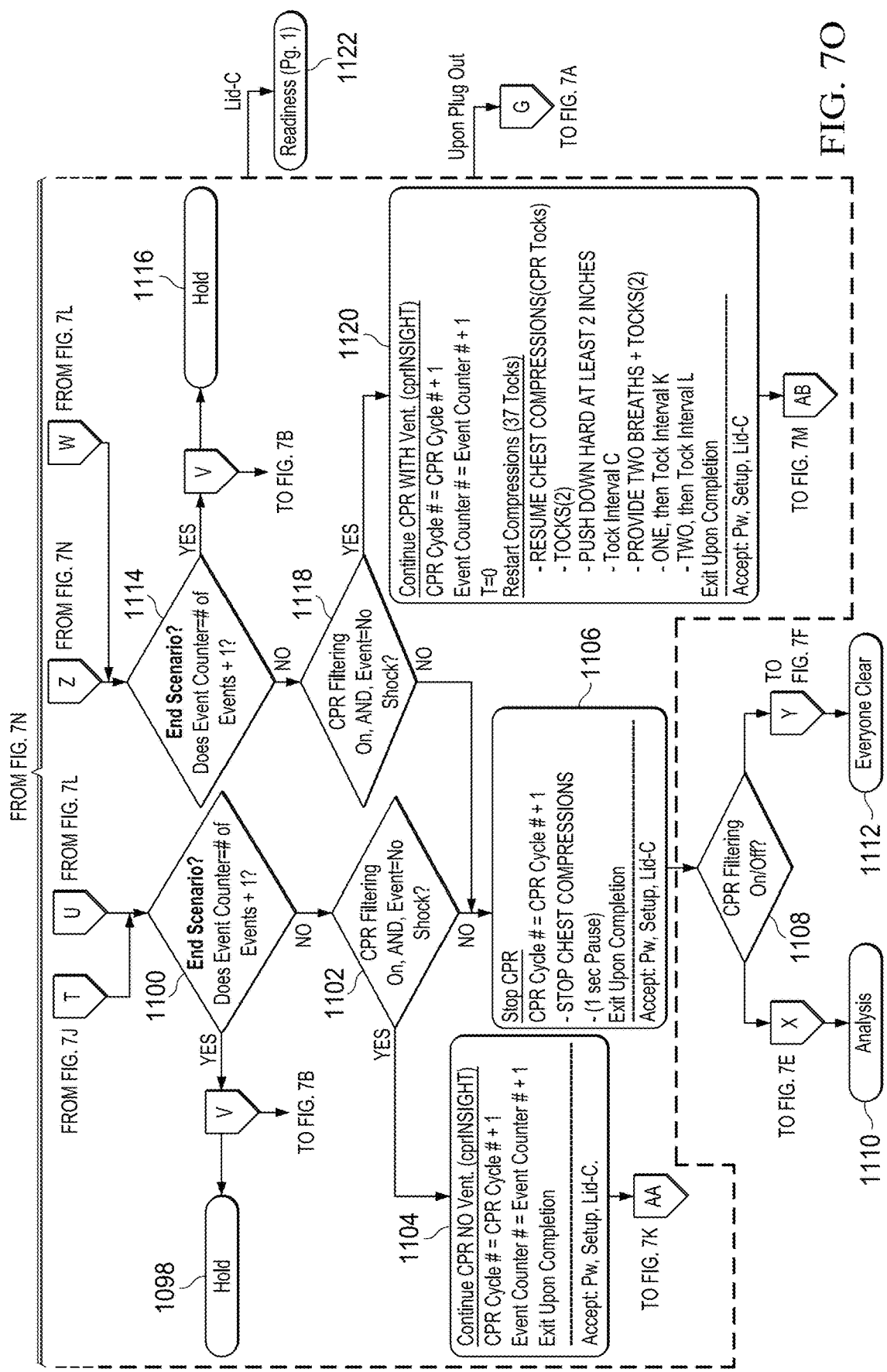
Figure 7P:
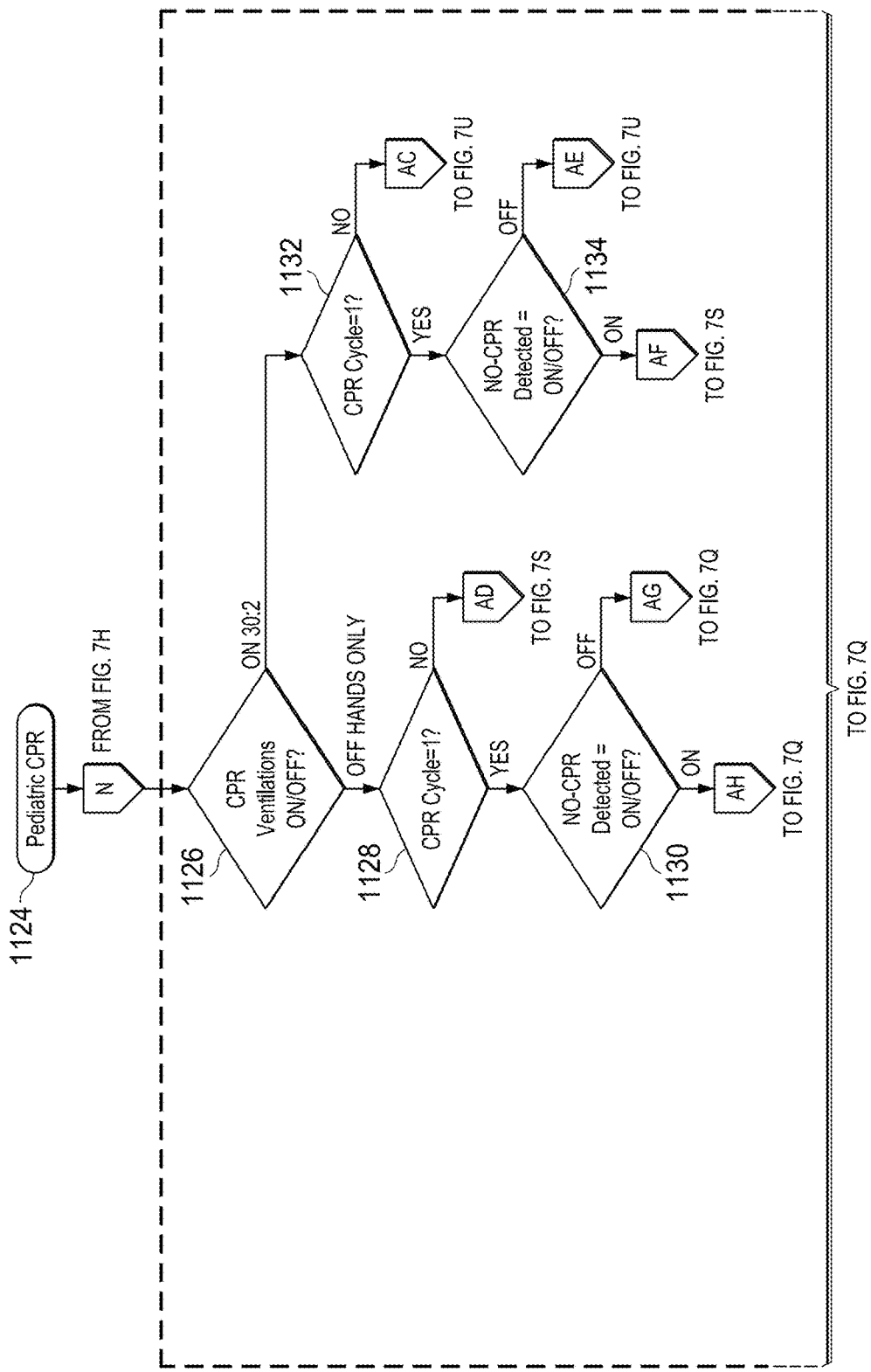
Figure 7S:
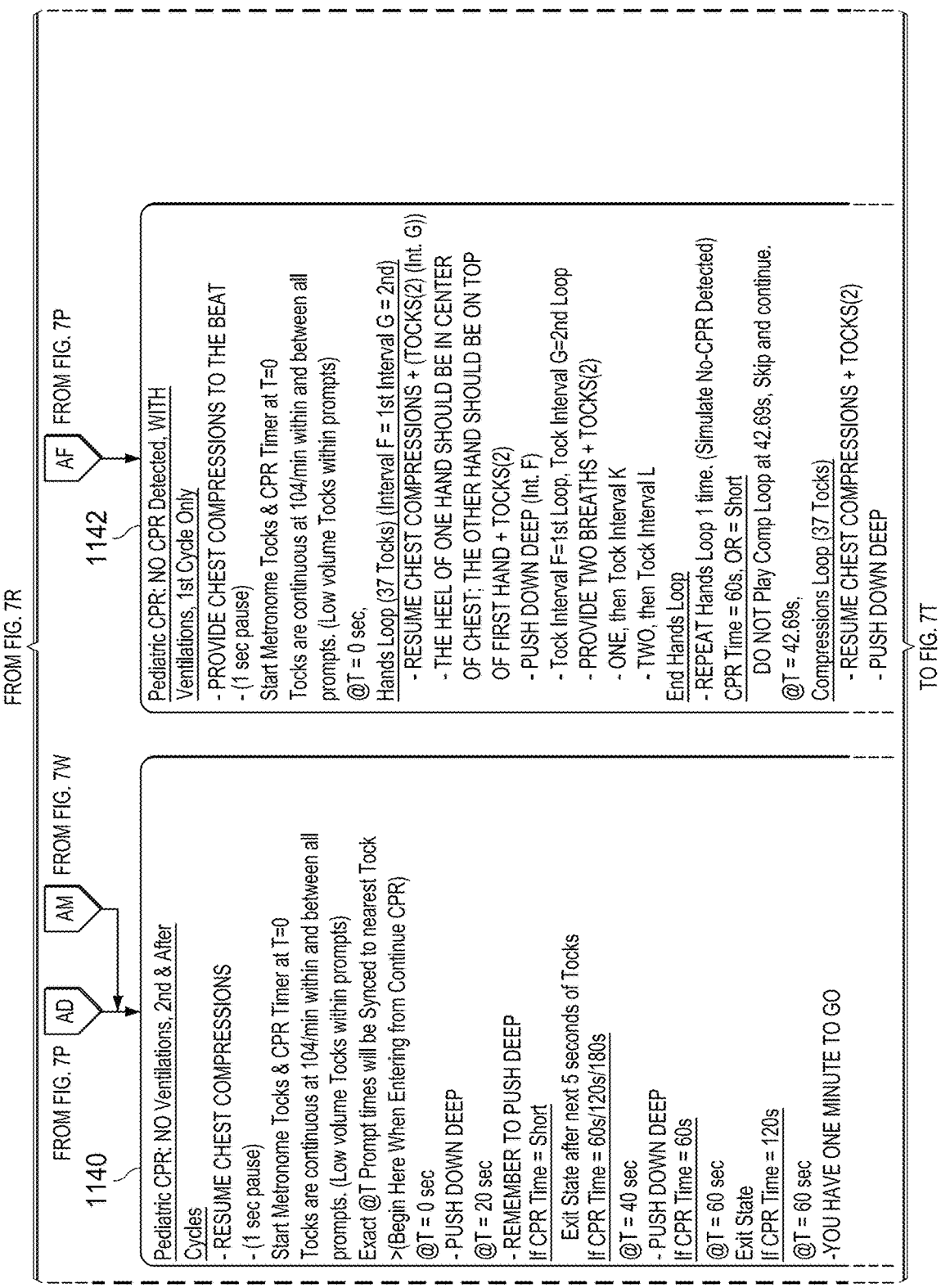
Figure 7T:
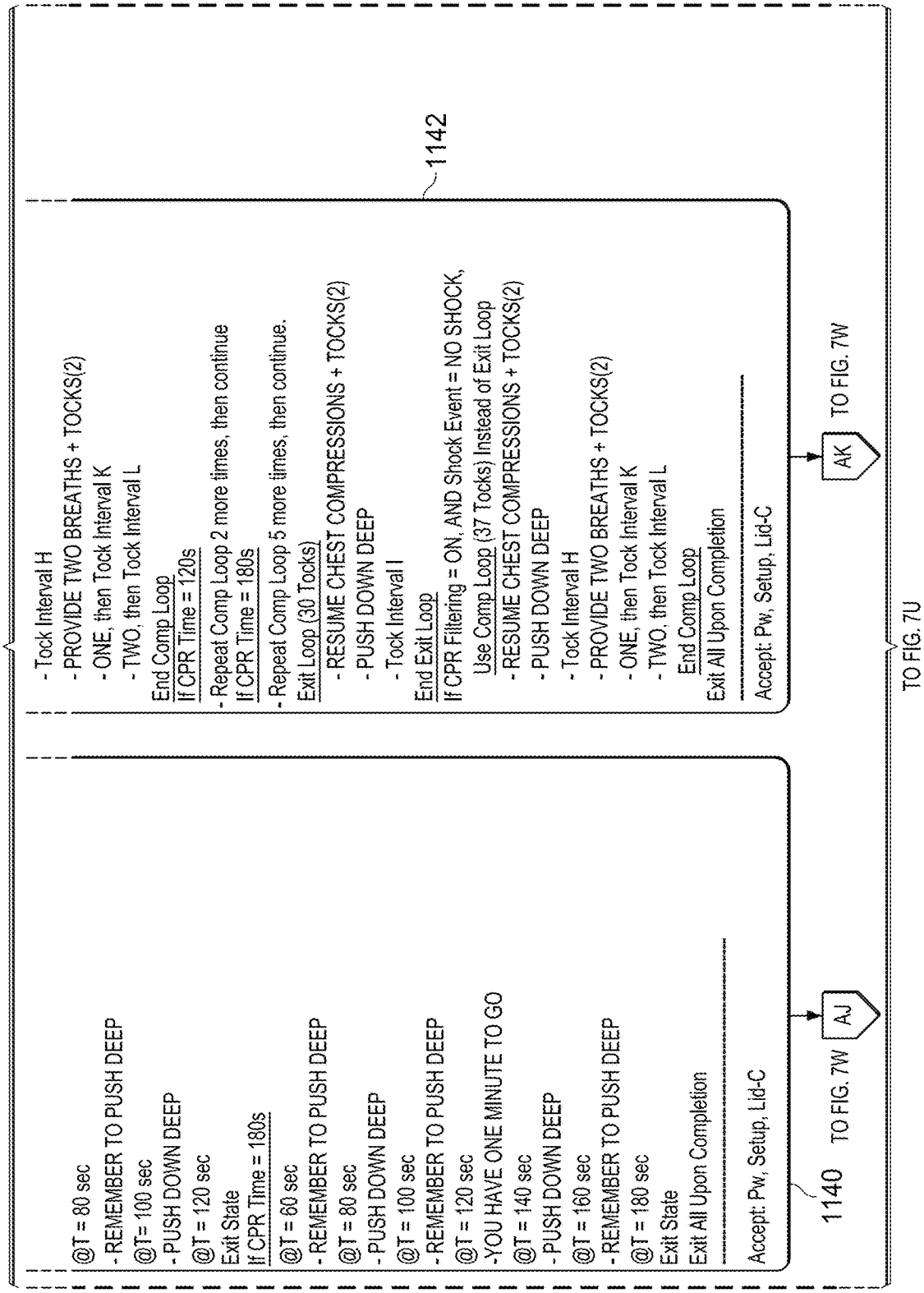
Figure 7U:
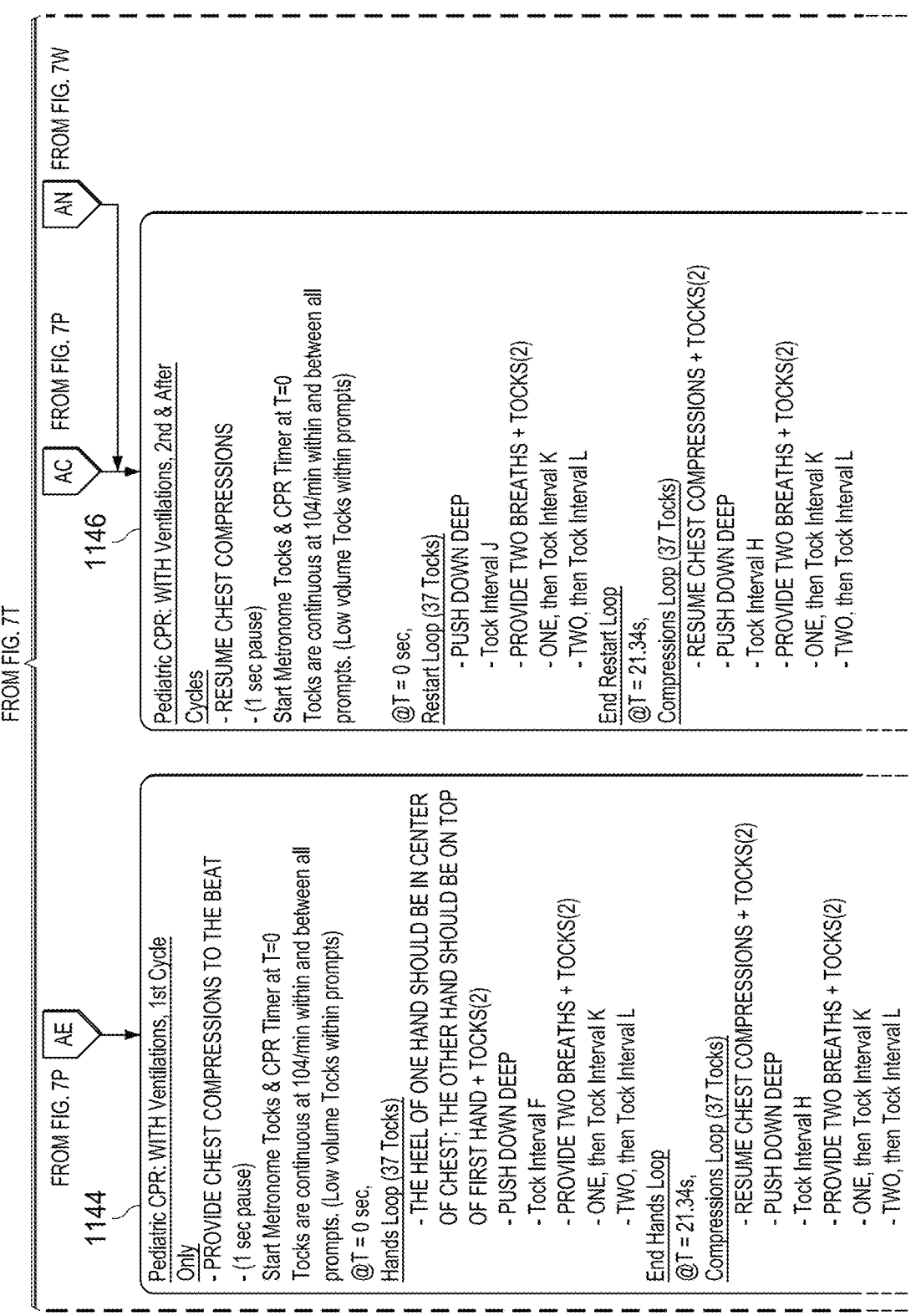
Figure 7V:
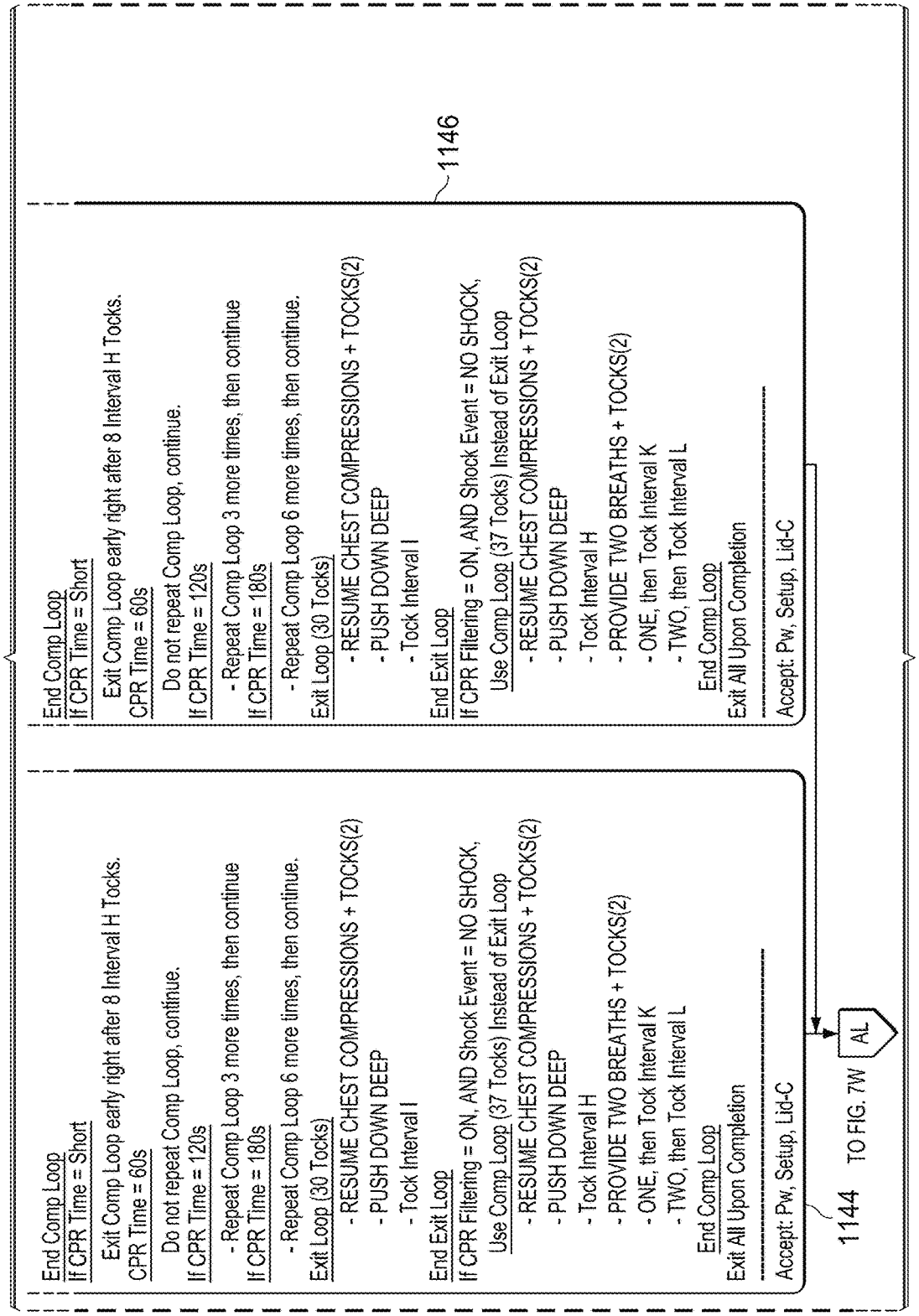
Figure 7W:
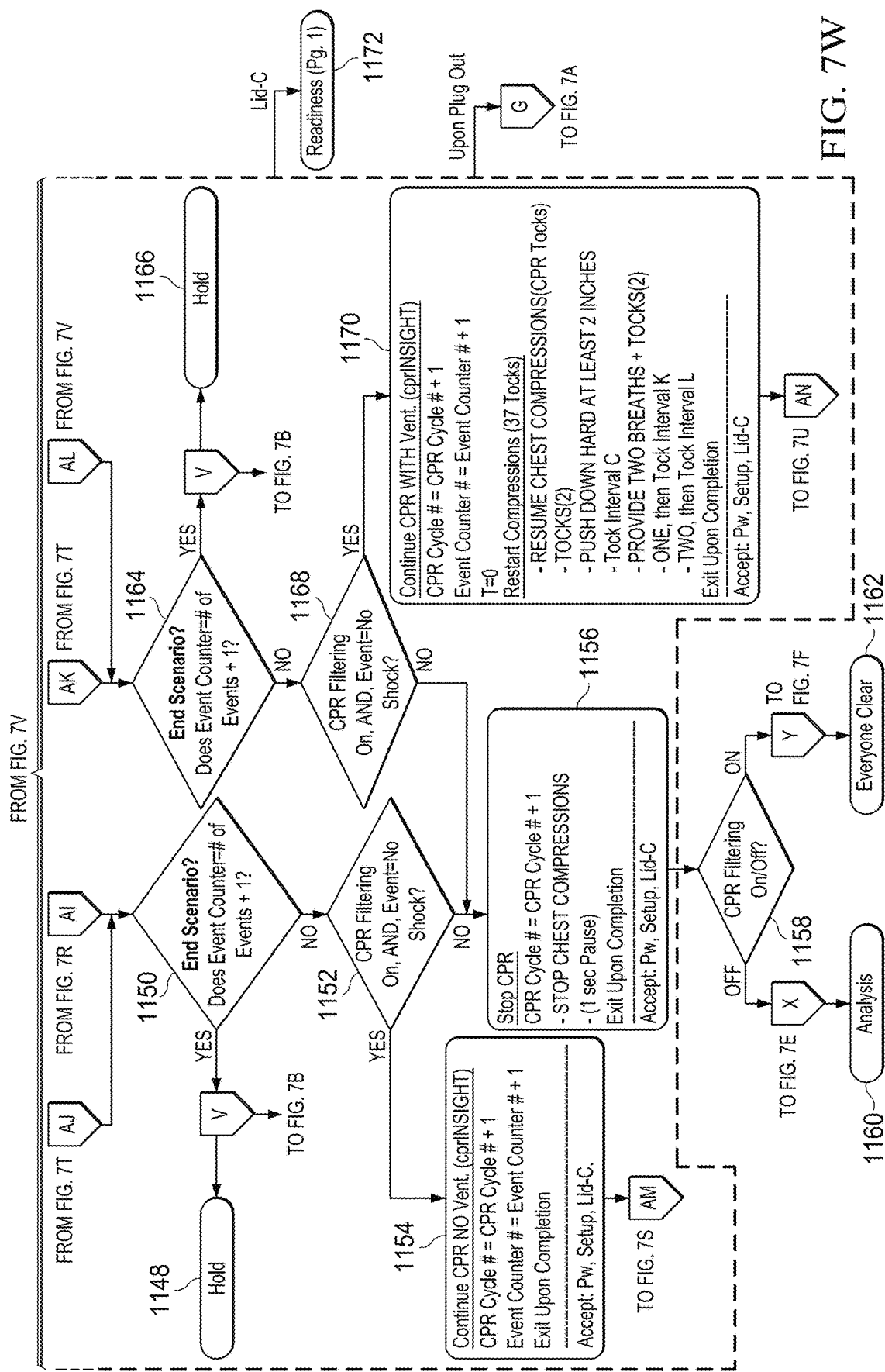
Figure 7X:
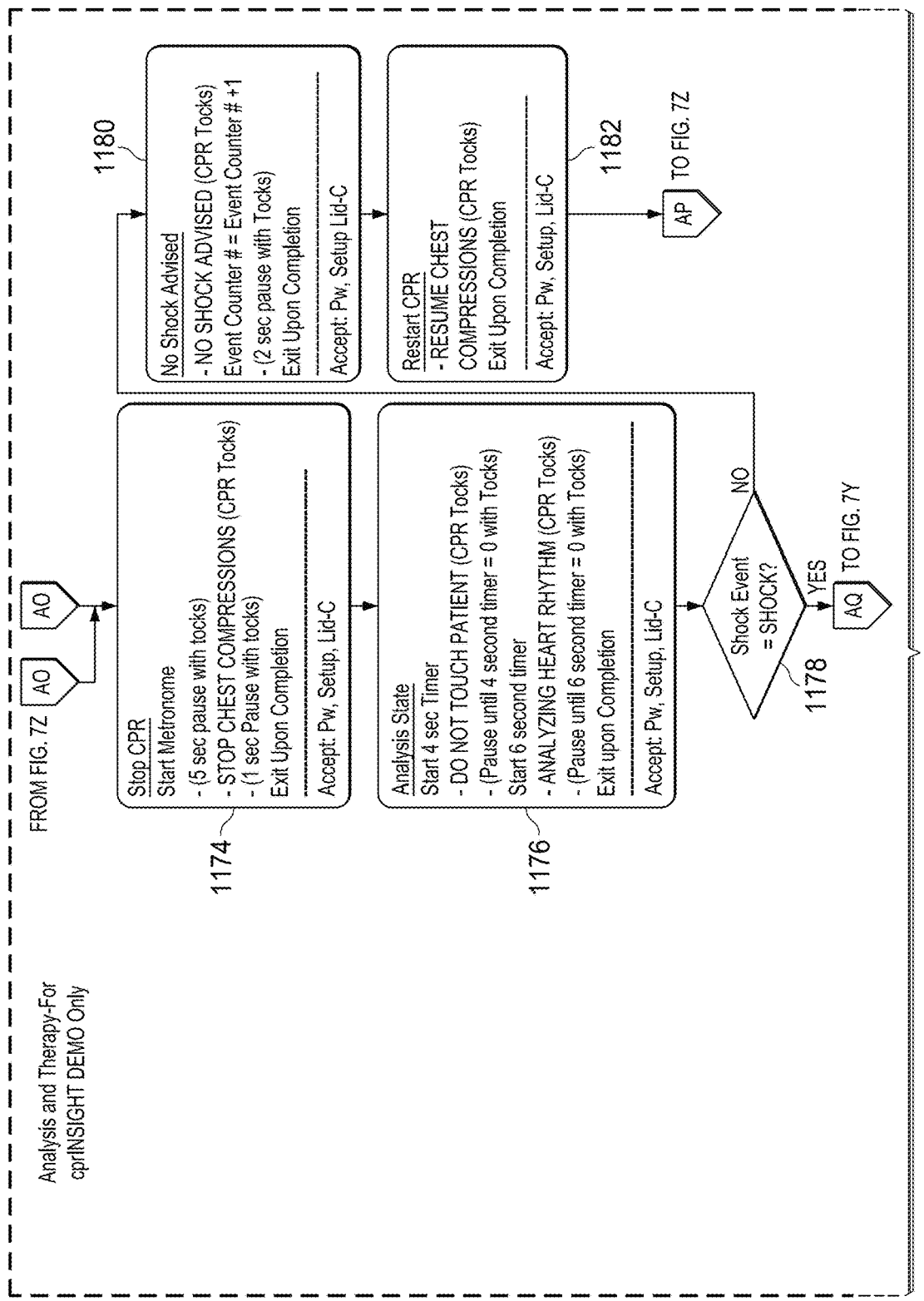
Figure 7Y:
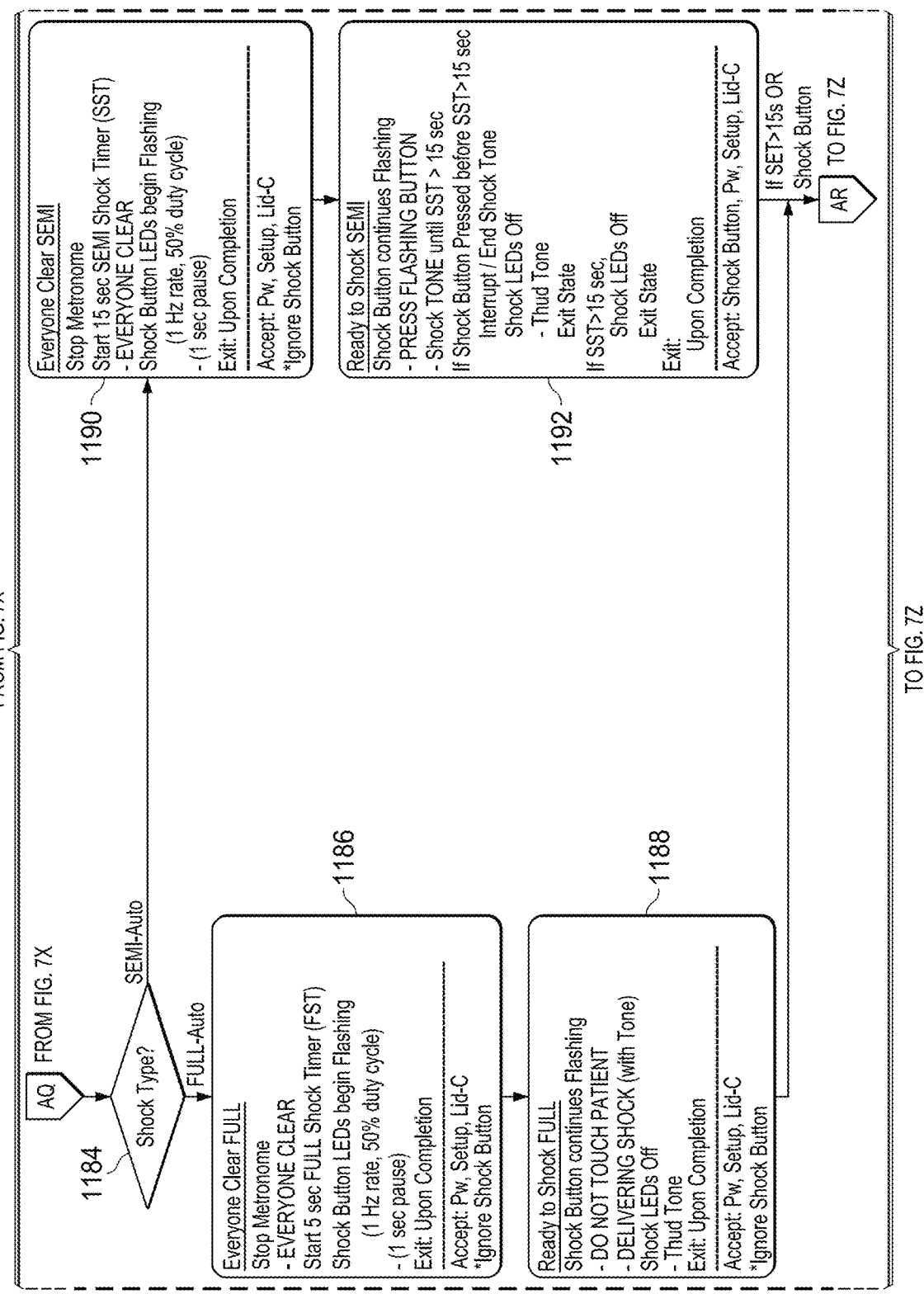
Figure 7Z:
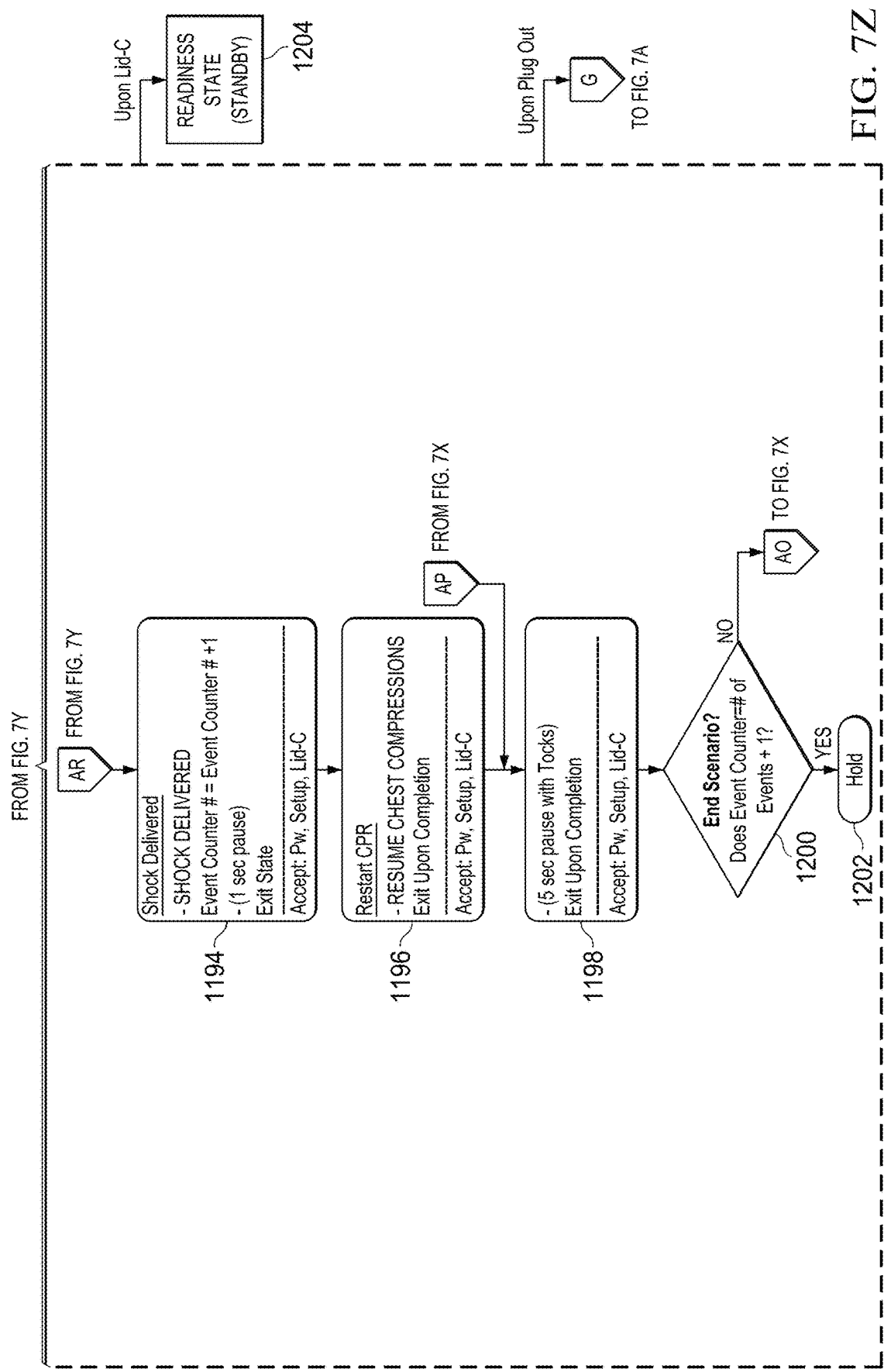

FIG. 1 is a front view of the inventive AED trainer programmed to carry out the methods of the present invention, and particularly to execute and embody the state machine represented by the state transition diagram of FIGS. 7A-7Z. As discussed in greater detail below, the state transition diagram illustrates the states and transitions between states of a state machine comprising an ordered combination or configuration of elements designed to solve a specific technological problem, namely, operating an AED trainer in an efficient and effective manner to achieve the beneficial effect of training students to correctly perform rescue procedures on patients suffering from Sudden Cardiac Arrest. Before describing the state machine embodying the invention, we will first describe an illustrative design for the physical housing of the inventive apparatus.

Figure 2:
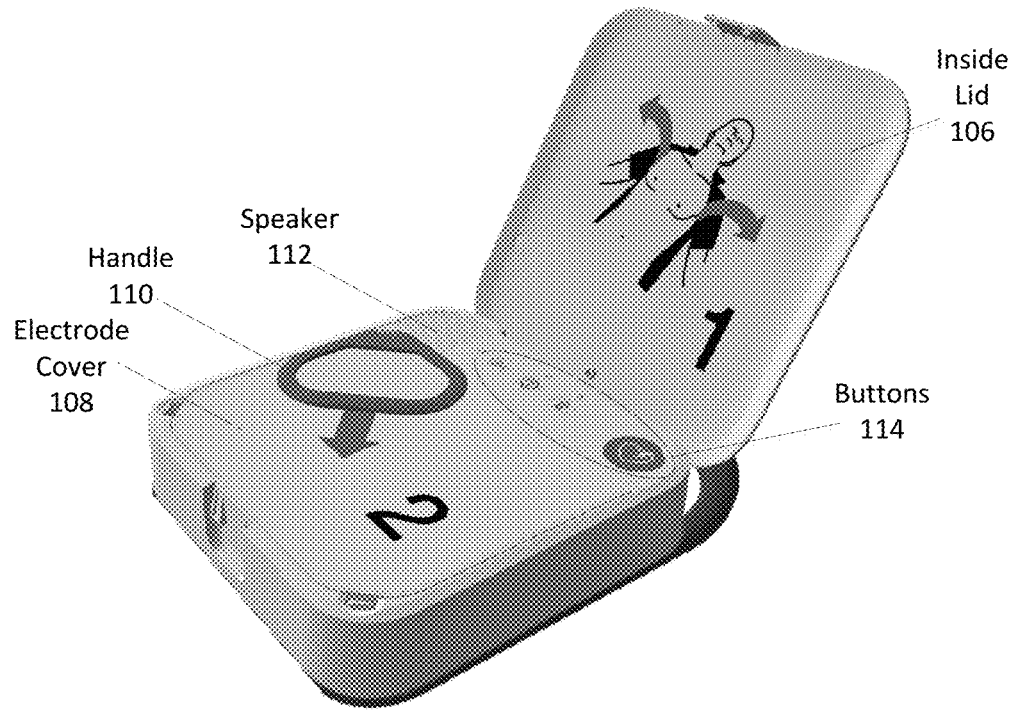
FIG. 2 is perspective view of the AED trainer with its lid 102 open.
Figure 2A:
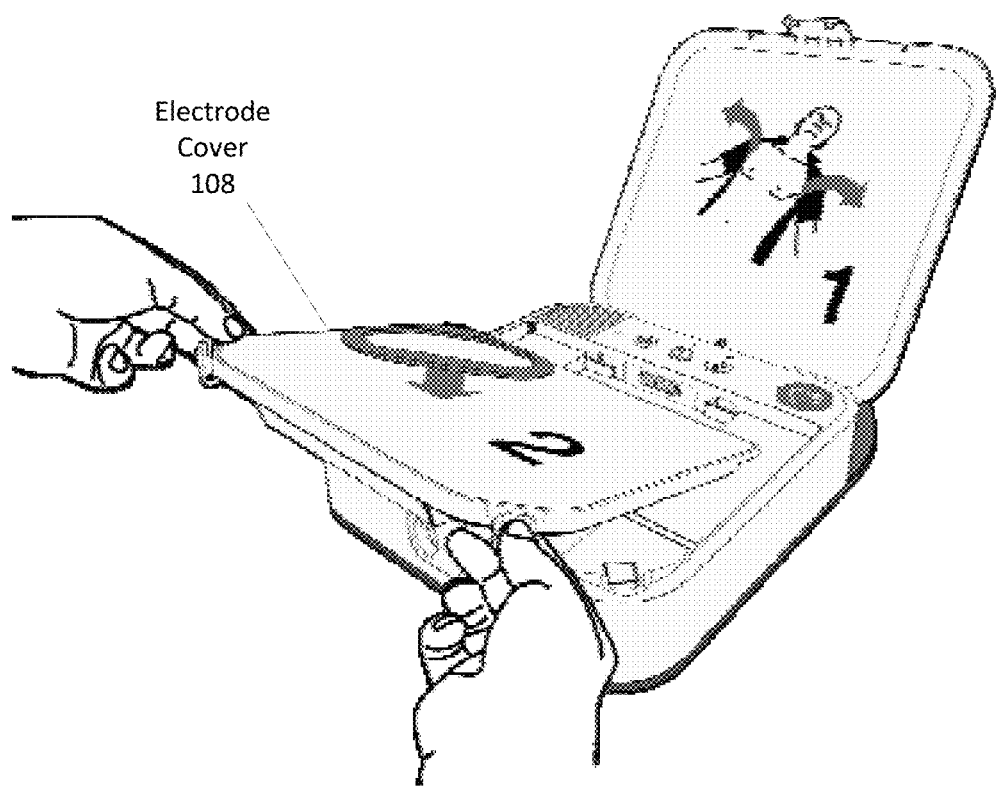
FIG. 2A is a similar perspective depicting removal of the electrode cover.

Referring to FIG. 1, the inventive apparatus 100 includes a lid 102 and a handle 104. FIG. 2 is a perspective view of the AED trainer with the lid 102 in an open position. As shown, the inside face 106 of the lid 102 depicts a graphic for guiding the student in preparing a manikin, representing a live patient, for treatment. In addition, the apparatus 100 includes an electrode cover 108, handle 110 for lifting the cover, speaker 112, and a set of buttons 114. As shown in FIG. 2A, the electrode cover 108 can be removed to reveal the electrodes, or pads.

Figure 3:
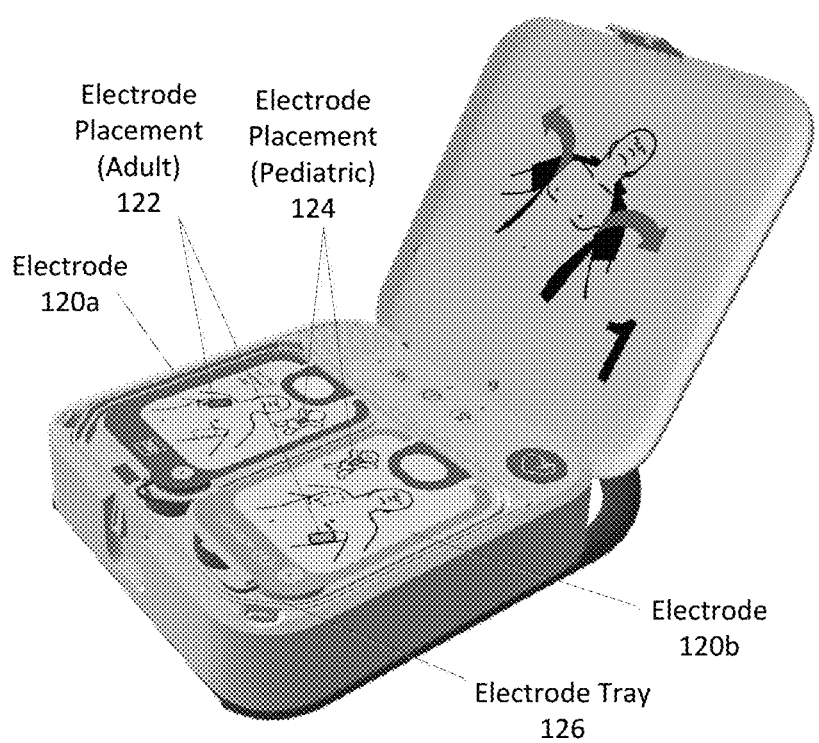
FIG. 3 is perspective view of the AED trainer with its lid 102 open and electrode cover fully removed, showing the electrodes and other features of the apparatus.

As shown in FIG. 3, the AED trainer 100 includes a first electrode 120a and a second electrode 120b. These electrodes are also called 'pads'. Each of the respective electrodes includes a graphic 122 and 124 depicting where the electrode should be placed for adult and pediatric patients. As shown, the electrodes 120a and 120b are placed in an electrode tray 126.

Figure 4:
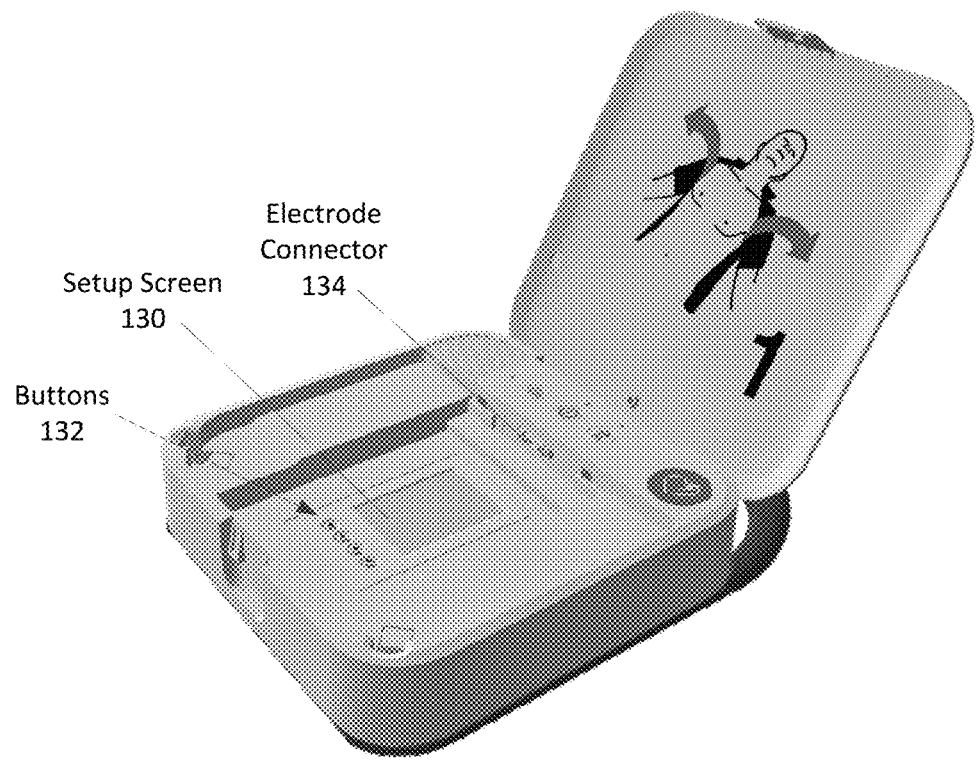
FIG. 4 is perspective view of the AED trainer with the electrode cover and electrodes removed, showing the electrode connectors and setup module.
Figure 3A:
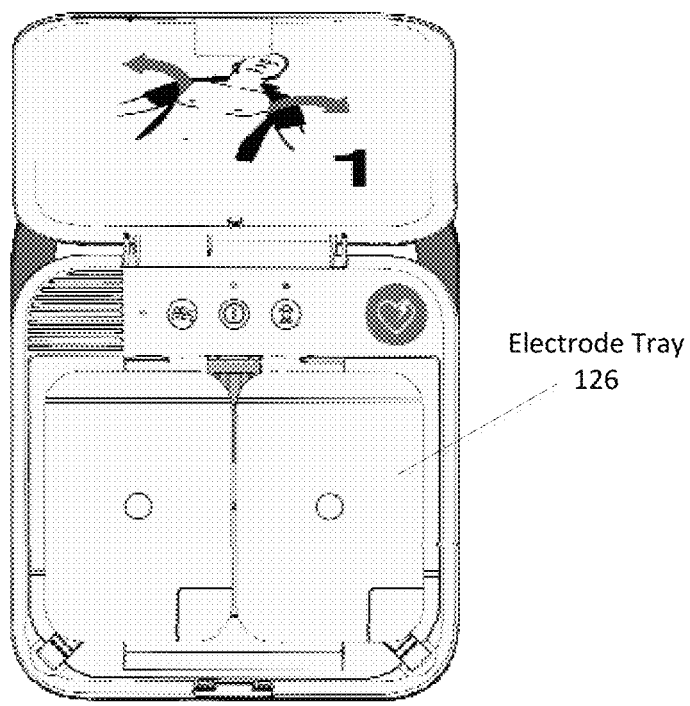
FIG. 3A is a similar view showing the electrode tray with the electrodes removed.
Figure 4A:
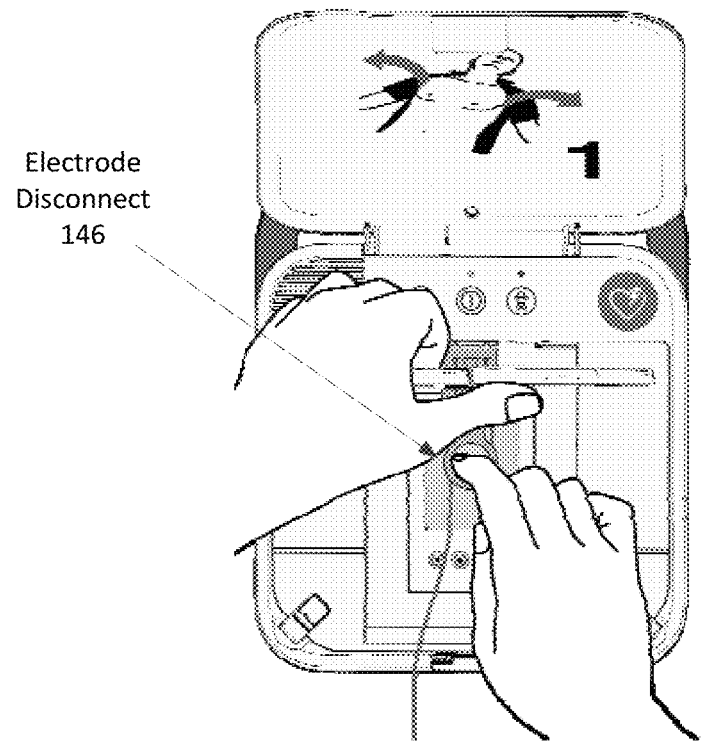
FIG. 4A is a similar view showing how a user can disconnect the electrodes.

Referring to FIG. 4, when the electrode tray 126 is removed, the student can access the setup screen of a control module 130, user interface buttons 132, and electrode connector 134. FIGS. 3A and 4A further illustrate how the electrode tray 126 can be removed, and how the student can disconnect the electrodes using the electro disconnect handle 146.

It is known that the effectiveness of an AED in treating Sudden Cardiac Arrest depends on early defibrillation as well as effective CPR. Although many currently marketed AEDs guide lay rescuers to perform CPR through voice prompts, users frequently make errors while following the voice prompts. Graphical signs may be provided on the AED electrode pad liners to emphasize key elements of CPR, including hand placement, body posture, compression direction and rate. These graphical instructions are intuitive to understand and effectively address common use errors during CPR performance. Moreover, the presentation of graphics does not create information overload and is provided just when it is needed.

High-quality CPR after defibrillation is critical in sudden cardiac arrest resuscitation. The 2015 American Heart Association Guidelines recommend that, for an adult patient, CPR compressions should be performed at 100-120 beats per minute and reach at least 2 inches in depth. Lay rescuers, even with prior CPR training and guided by AED voice prompts, oftentimes make various errors while performing CPR leading to less optimal outcome. Common errors in CPR performance include:

Delay in starting CPR after defibrillation—lay rescuers wait until after the initial CPR voice prompts are over before starting chest compression.

Hand placed too low on patient's chest—instead of placing hands in the center of chest, many lay rescuers place hands below the sternum. This increases the difficulty of reaching the required 2-inch compression depth and leads to rescuer fatigue more easily.

A small percentage of operators perform CPR at half of the required rate despite audio beats (metronomes) provided by the AED.

Lay rescuers not trained in CPR use incorrect body posture that decreases CPR efficiency and increases rescuer fatigue.

Most marketed AEDs provide voice prompts to guide a lay rescuer perform CPR. However, voice prompts alone are not adequate to address the above errors. Providing graphical instructions to show how to perform CPR is an effective way to prevent these use errors, because the visual format is congruent with the information content and is easy and quick to grasp. Graphical presentation of CPR instructions presents a challenge from a design perspective. AEDs are intended for use by lay rescuers in high-stress situations. Because of this, the user interface design of an AED should be simple and intuitive to facilitate device use without information overload during an emergency. To that end, the graphics may be presented on the electrode pad liners as shown. Because of this placement, the graphics are not visible until after the electrode pads are removed from the liners and applied to patient. When it's time to perform CPR and the AED annunciates CPR voice prompts, the rescuer can reference the graphics on the liners for correct hand placement, body posture, compression direction and rate. This feature is applicable to AEDs and AED trainers with liners for electrodes. It is most effective if the liners remain fixated on the AED or trainer after the electrodes are removed, and therefore stay in sight.

Figure 5:
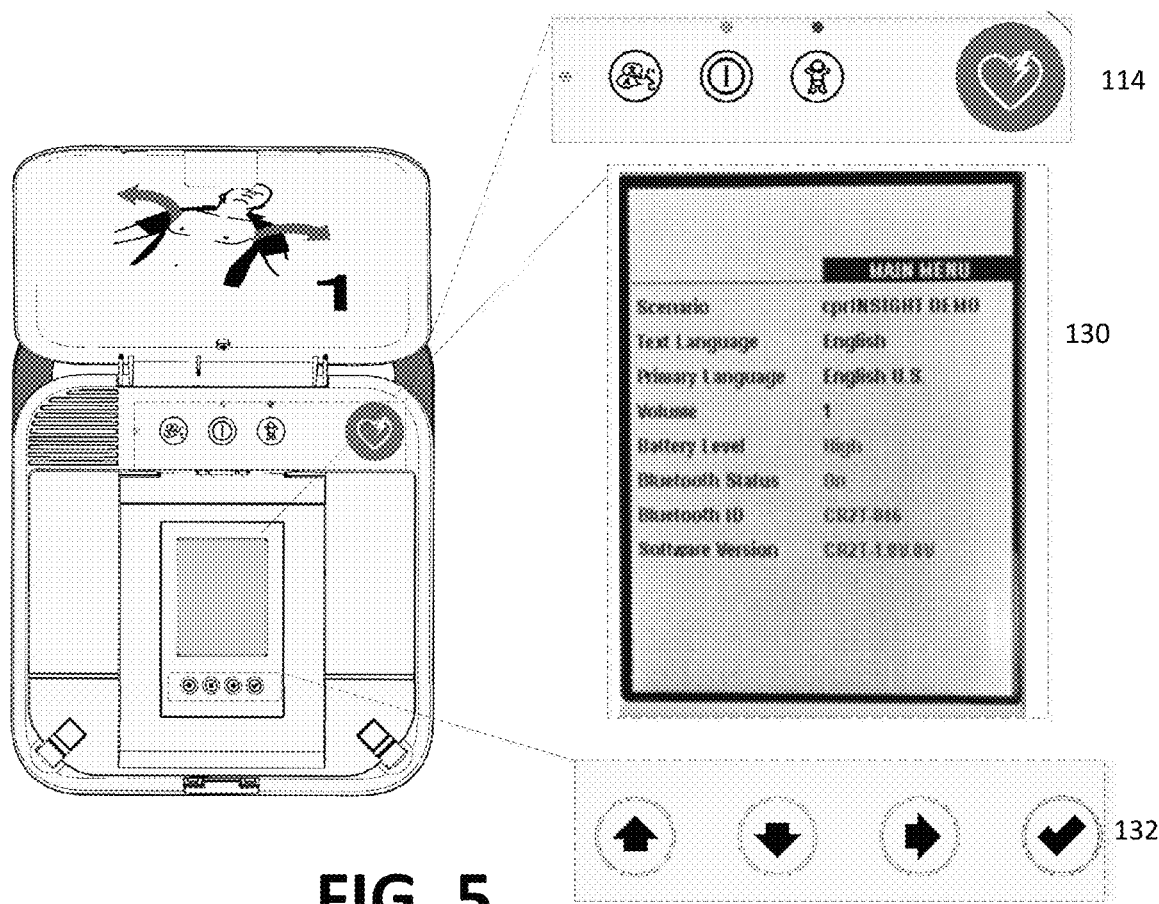
FIG. 5 is an exploded view of the AED trainer showing details of the control module and user interface elements.
Figure 6:
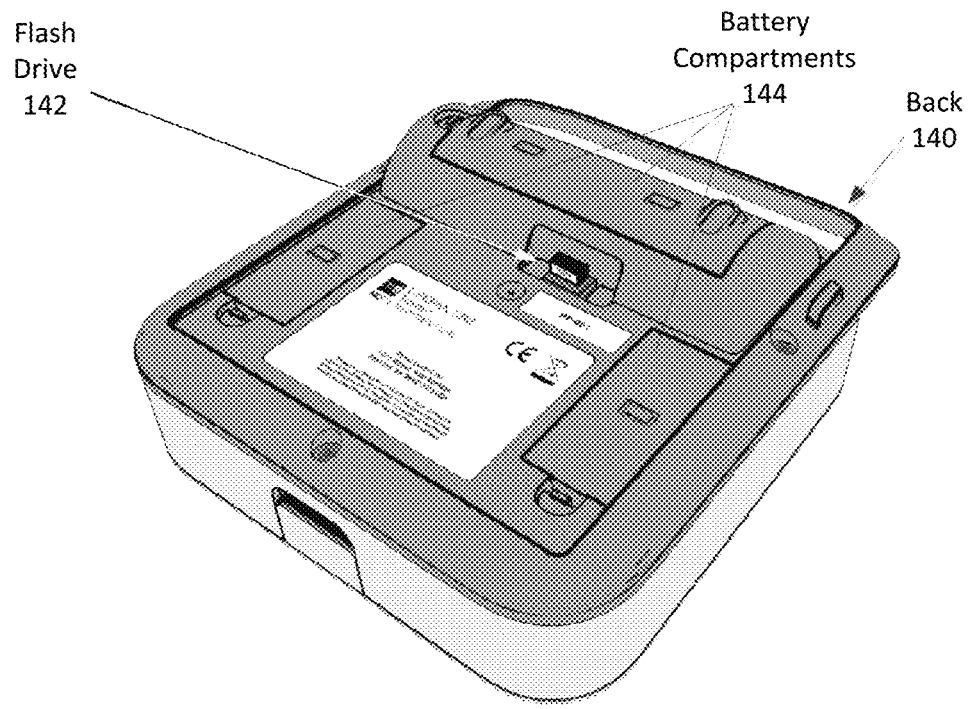
FIG. 6 is a bottom view of the AED training apparatus, showing the battery compartments and flash drive.

FIG. 5 is an exploded view of the AED trainer showing features of the control module and user interface elements. As shown in FIG. 5, once the electrode tray 126 is removed and the control module is exposed, the user has access to a setup screen of control module 130, buttons 114, and additional buttons 132. FIG. 6 is a view of the bottom or back surface 140 of the AED training apparatus, showing the flash drive 142 and battery compartments 144.

In the illustrative embodiment, the AED trainer features a unique screen setup mode and demonstrable aspects including multiple languages, automatic volume adjustment, child mode, and connectivity with Bluetooth technology. The inventive AED trainer has the ability to demonstrate and train users with many new features that, to date, have not been available in existing training systems. The following features are included in the illustrative embodiment:

1. Multilingual: The inventive system simulates an AED with more than one language available. The user can push a button or provide another physical or mechanical trigger such as a key to switch prompting between languages. This multiple language feature can be turned ON or off.

2. Adult and Child Mode: The inventive system includes a switch between an adult mode and a child mode. The user can push a button or provide another physical or mechanical trigger such as a key to switch prompting between modes. Setting changes between the modes could include prompting, electrode placement, AED analysis/shock, or CPR instruction. This child mode feature can be turned ON or off.

3. No CPR Detected: The AED trainer simulates a user not performing CPR and provides additional guidance, which could be in the form of prompts or visual cues. This could include repeating previous instruction or providing new instruction targeted at resuming CPR. This feature can be turned ON or off. A trainer can also actually detect CPR performance, potentially through accelerometer/app or other technologies, and provide real time CPR feedback if no CPR is detected or on CPR performance including rate, depth and recoil.

4. CPR technology: The AED trainer further simulates the trainer performing analysis during charging and compressions. With a shock advised, the trainer simulates a shorter CPR pause time. With no shock advised, the trainer simulates no CPR pause time for analysis and a continued CPR period. This feature can be turned ON or off.

5. Check Responsiveness: The AED trainer can provide prompting to encourage the user to check for breathing, airway, circulation, signs of life, or other responsiveness measures. This check is still a guidelines recommendation in some regions. This feature can be turned ON or off.

State Machine and State Transition Diagram

We will now describe in greater detail the operating procedures of an illustrative, presently preferred implementation of the AED training apparatus. The operating procedures, or operating modes, may be implemented using a complex set of rules defining the configuration of a state machine (SM). For this purpose, we refer to the state transition diagram represented by FIGS. 7A-7Z. It should be noted that, in the following description of operating procedures with reference to FIGS. 7A-7Z, we will generally describe the individual states, or blocks, and refer to them using the associated reference numerals, but we will not reiterate the textual descriptions in each block of the diagram. Such description would be repetitious of the textual material in each block and therefore unnecessary since the drawings are considered to form a part of the present written description. Hence, the diagrams of FIGS. 7A-7Z represent the states and transitions between states of the inventive SM within the AED training apparatus. Overall, the state transition diagram of FIGS. 7A-7Z illustrate the invention in the form of a state machine comprising an ordered configuration of elements designed to solve a specific technological problem, namely, efficiently and effectively operating an AED trainer to achieve the beneficial result of training students to rescue patients suffering from Sudden Cardiac Arrest.

FIGS. 7A and 7B make up a state transition diagram, or the portion of the overall state transition diagram, representing the Power Up, pads Test, Setup, and Standby operating modes. FIGS. 7C and 7D depict the Startup and pads modes. FIGS. 7E and 7F depict the Analytics and Therapy modes. FIG. 7G depicts the Shut-off routine. FIGS. 7H-7O depict the Adult CPR mode. FIGS. 7P-7W depict the Pediatric CPR mode. Finally, FIGS. 7X-7Z depict the Analytics and Therapy operations for the cprINSIGHT demonstration mode.

Referring now to FIG. 7A, this part of the inventive SM includes State 1000 (OFF state, lid open), State 1002 (OFF state, lid closed), State 1004 (power up), State 1006 (setup mode), State 1008 (write to EE-off), State 1010 (utilities mode), and State 1012 (pads test mode). In addition, the diagram includes connectors A, B, C, and G. These connectors connect the various states to states at different parts of the State transition diagram, as can be seen in the other parts of the State transition diagram.

Turning now to FIG. 7B, this part of the SM includes State 1014 (write to EE-continue), State 1016 (hold), State 1018 (READINESS state, Standby), State 1020 (any ON state power button), State 1022 (pause), and State 1024 (previous state). Also shown in FIG. 7B are connectors A, B, C, D, F, H, M, and V.

FIG. 7B transitions to FIG. 7C, as indicated by connector D. Referring to FIG. 7C, which depicts the startup and pads mode, we have State 1026 (Place pads), State 1028 (Language Selection), and State 1030 (Adult/Pediatric Selection). State 1026 leads to FIG. 7D. As shown, connector E leads to FIG. 7E when the plug is inserted and both pads are ON. As shown in FIG. 7D, connector F leads back to FIG. 7B; connector G leads back to FIG. 7A; and connector H leads back to FIG. 7B.

The Analysis and Therapy mode is depicted in FIGS. 7E and 7F. Referring to FIG. 7E, the connector E from FIG. 7D takes us to the Analysis State 1034. In addition, State 1036 (motion detected), State 1038 (shock event?), State 1040 (no shock advised), State 1042 (pulse prompt ON or OFF?), and State 1044 (pulse prompts ON) are included in FIG. 7E. As shown, connectors I and K lead to FIG. 7F.

Referring now to FIG. 7F, the remaining states of the analysis and therapy mode include State 1046 (stop CPR), State 1048 (shock type?), State 1050 (everyone clear FULL), State 1052 (ready to shock FULL), State 1054 (shock delivered), State 1056 (CPR), State 1058 (everyone clear SEMI), State 1060 (ready to shock SEMI), and State 1062 (shock not delivered). connector G leads back to FIG. 7A, and connector M leads back to FIG. 7B.

FIG. 7G depicts the shut-off routine. This routine includes State 1064 (automatic shut-off routine), State 1068 (power button held for more than 3 seconds), State 1066 (shut-off state), and State 1070 (OFF state).

FIGS. 7H-7O depict the adult CPR mode. Referring to FIG. 7H, connector K leads to FIG. 7H from FIG. 7F. The adult CPR mode begins with State 1072 (age mode=child or adult). If age mode=child, the SM transitions to State 1074 (pediatric CPR), which is shown at FIG. 7P. If age mode=adult, the SM transitions to State 1076 (CPR ventilations ON or OFF?). If ON, the SM transitions to State 1078 (CPR cycle=1?). If YES, the SM transitions to State 1080 (no CPR detected=ON or OFF?). connector P corresponds to no CPR=OFF and leads to FIG. 7M, whereas connector Q corresponds to no CPR=ON and leads to FIG. 7K. Moreover, as shown, if CPR ventilations is OFF at State 1076, the SM transitions to State 1082 (CPR cycle=1?). If YES, the SM transitions to State 1084 (no CPR detected=ON or OFF?). connector R corresponds to no CPR=OFF and leads to FIG. 7I. connector S corresponds to no CPR=ON and similarly leads to FIG. 7I.

Referring to FIGS. 7I and 7J, connector S from FIG. 7H leads to State 1086 (CPR: NO CPR detected, NO ventilations, $1^{st}$ cycle only). connector R from FIG. 7H leads to State 1088 (CPR: NO ventilations, $1^{st}$ cycle only). As shown in FIG. 7J, connector T leads to FIG. 7O.

Referring to FIGS. 7K and 7L, connectors O and Q from FIG. 7H lead, respectively, to State 1090 (CPR: NO ventilations, $2^{nd}$ and after cycles) and State 1092 (CPR: NO CPR detected, WITH ventilations, $1^{st}$ cycle only). These states are depicted in FIGS. 7K and 7L, and FIG. 7L includes connectors U and W, which lead to FIG. 7O.

Referring to FIGS. 7M and 7N, connector P leads from FIG. 7H to State 1094 (CPR: WITH ventilations, $1^{st}$ cycle only). In addition, connector L from FIG. 7H and connector AB from FIG. 7O lead to State 1096 (CPR: WITH ventilations, $2^{nd}$ and after cycles). States 1094 and 1096 are continued in FIG. 7N, which includes connector Z that leads to FIG. 7O.

FIG. 7O includes connector T from FIG. 7J, connector U from FIG. 7L, connector Z from FIG. 7N, and connector W from FIG. 7L. In addition, FIG. 7O depicts State 1100 (end scenario?). If YES, the SM transitions to the hold State 1098, which corresponds to connector V leading to FIG. 7B. If NO, the SM transitions to State 1102 (CPR filtering ON, AND, event=no shock?). If YES, the SM transitions to State 1104 (continue CPR NO ventilation). State 1104 leads to connector AA and FIG. 7K. At State 1102, if the decision output is NO, the SM transitions to State 1106 (stop CPR). The SM transitions from State 1106 to State 1108 (CPR filtering ON/OFF?). This State in turn leads to connector X and State 1110 (analysis), or State 1112 (everyone clear) and corresponding connector Y and FIG. 7F. connector Z from FIG. 7 leads to State 1114 (End scenario? Does event counter=number of events plus 1?). If YES, the SM transitions to connector V and FIG. 7B, which correspond to the hold State 1116. If NO, the SM transitions to State 1118 (CPR filtering ON, AND, event=no shock?). If YES, the SM transitions to State 1120 (continue CPR with ventilation). If NO, the SM transitions to State 1106, as shown. From State 1120, the SM transitions to connector AB and FIG. 7M. Also shown in FIG. 7O are State 1122 (Readiness) and connector G leading back to FIG. 7A.

FIGS. 7P-7W depict the pediatric CPR mode. The pediatric CPR mode begins at State 1124 and connector N from FIG. 7H. At State 1126 (CPR ventilations ON/OFF?), the SM transitions to State 1128 if CPR ventilations are OFF, and transitions to State 1132 if CPR ventilations are ON. In State 1128 (CPR cycle=1?), the SM transitions to connector AD and FIG. 7S if NO, and transitions to State 1130 (no CPR detected=ON/OFF?). From State 1130, the SM transitions to connector AH if ON, and to connector AG and FIG. 7A if OFF. At State 1126, if CPR ventilations are ON, the SM transitions to State 1132 (CPR cycle=1?). If YES, the SM transitions to State 1134, and if NO transitions to connector AC and FIG. 7U. At State 1134 (no CPR detected=ON ON/OFF?), the SM transitions to connector AF and FIG. 7S if ON, and to connector AE and FIG. 7U if OFF.

Referring to FIG. 7Q, connector AH from FIG. 7P leads to State 1136 (pediatric CPR: no CPR detected, no ventilations, $1^{st}$ cycle only), which is depicted in FIGS. 7Q and 7R. connector AG from FIG. 7P leads to State 1138 (pediatric CPR: no ventilations, $1^{st}$ cycle only), which also spans FIGS. 7Q and 7R. FIG. 7R includes connector AI, which leads to FIG. 7W.

FIG. 7R flows into FIG. 7S, which includes connectors AD and AF from FIG. 7P and AM from FIG. 7W. connectors AD and AM connect to State 1140 (pediatric CPR: NO ventilations, $2^{nd}$ and after cycles), which spans FIGS. 7S and 7T. connector AF flows into State 1142 (pediatric CPR: NO CPR detected, WITH ventilations, $1^{st}$ cycle only), which also spans FIGS. 7S and 7T. FIG. 7T includes connectors AJ to FIG. 7W and AK to FIG. 7W, and flows into FIG. 7U.

FIG. 7U includes connectors AE and AC from FIG. 7P as well as connector AN from FIG. 7W. connector AE flows into State 1144 (pediatric CPR: WITH ventilations, $1^{st}$ cycle), which spans FIGS. 7U and 7V. State 1144 (pediatric CPR: WITH ventilations, $1^{st}$ cycle only), spans FIGS. 7U and 7V. State 1146 (pediatric CPR: WITH ventilations, $2^{nd}$ and after cycles) likewise spans FIGS. 7U and 7V. FIG. 7V includes connector AL to FIG. 7W.

FIG. 7W includes connectors AJ and AK from FIG. 7T, connector AI from FIG. 7R, and connector AL from FIG. 7V. connectors AJ and AI lead to State 1150 (end scenario? Does event counter=number of events+1?). If NO, the SM transitions to State 1152 (CPR filtering ON, AND, event=no shock?). If the answer is YES at State 1150, the SM transitions to the hold State 1148 and connector V, which leads to FIG. 7B. As shown, State 1152 flows to State 1154 (continue CPR no ventilation (cprINSIGHT)) if the output of State 1152 is YES, and flows to State 1156 (stop CPR) if the output is NO. State 1156 leads to State 1158 (CPR filtering ON/OFF?) and then to an analysis State 1160 and connector X if the output of State 1158 is OFF, and to State 1162 (everyone clear) and connector Y if the output is ON. State 1164 (end scenario? Does event counter=number of events+1?) leads to connector V and the State 1166 (Hold) if the output is YES, and to State 1168 (CPR filtering ON, AND, event=no shock?) if the output is NO. If the output of State 1168 is YES, the SM transitions to State 1170 (continue CPR with ventilation (cprINSIGHT)). On the other hand, if the output of State 1168 is NO, the SM transitions to State 1156. State 1170 leads to connector AN and FIG. 7U. FIG. 7W also shows State 1172 (Readiness) and connector G, which leads to FIG. 7A upon a plug out event.

FIGS. 7X-7Z depict the Analytics and Therapy operations for the cprINSIGHT demonstration mode. Referring to FIG. 7X, connector AO leads into State 1174 (stop CPR), which is followed by state 1176 (Analysis). Next, at State 1178 the SM determines whether there is a shock event present. State 1178 (shock event=SHOCK?) leads to connector AQ and FIG. 7Y if YES, and to state 1180 (No Shock Advised) if NO. The SM transitions from state 1180 to State 1182 (Restart CPR), and then to connector AP and FIG. 7Z.

FIG. 7Y depicts connector AQ from FIG. 7X, which leads to State 1184 (Shock Type?). If the output of State 1184 is FULL, the SM transitions to State 1186 (Everyone Clear FULL). Following state 1186, the SM transitions to State 1188 (Ready to Shock FULL). If at State 1184 the shock type is determined to be SEMI, the SM transitions to State 1190 (Everyone Clear SEMI) and then to State 1192 (Ready to Shock SEMI). States 1188 and 1192 lead to connector AR and FIG. 7Z.

Referring to FIG. 7Z, connector AR needs to State 1194 (Shock Delivered), which is followed by State 1196 (Restart CPR). This state as well as connector AP from FIG. 7X is followed by State 1198 (Exit Upon Completion). The SM then transitions to State 1200 (End Scenario?). If the output of State 1200 is NO, the SM transitions to connector AG and FIG. 7X. If the output is YES, the SM transitions to state 1202 (Hold). FIG. 7Z also depicts State 1204 (Readiness or Standby), as well as connector G leading to FIG. 7A upon a plug-out event.

The following table of inputs, outputs, flags, counters, and tables may be considered along with the state transition diagrams depicted in FIGS. 7A-7Z.

Inputs, Outputs, Flags, Counters and Tables

| Device Inputs |
| --- |
| Training Inputs |

Pw: 'Power Button (Start/Pause <3 s, Off >3 s)
Sh: 'Shock Button
Lg: Language Button
Pd: Pediatric Button
Lid-O: Lid Open
Lid-C: Lid Close

| Device Inputs |
| --- |
| Plug and pad Inputs |
| Plug-Out
Plug In and Both pads Off
Plug-In and SPad On (Sternum pad)
Plug-In and APad On (Apex pad)
Plug-In and BOTH pads On |
| Setup Display Inputs |
| Up: Up Arrow Button
Dn: Down Arrow Button
Rt: Right Arrow Button
Ch: Confirm Check Button |

| Device Outputs |
| --- |
| Power Button LED |
| On Steady when Device On
Flashes 1x/6.0 s in Readiness if no faults
Flashes in Pause State (0.75 s On/0.25 s Off) |
| Pediatric Button LED |
| On when in Pediatric Mode |
| Shock Button LEDs (qty = 8) |
| Always Act In Unison
Flashes (1 Hz rate, 50% duty cycle) |
| Voice Prompts and Tones |
| As specified |
| Bluetooth |
| Device Ready (Plug In)
Device Fault (Plug Out)
Lid Opened
Pads Connected |
| LCD Display |
| As specified for Setup Screen State |
| Voice Prompts and Tones |
| Voice Prompts:
ADULT MODE
ANALYZING HEART RHYTHM
APPLY PADS TO BARE SKIN EXACTLY AS SHOWN IN THE PICTURES
CHECK FOR BREATHING
CHECK PADS FOR GOOD CONTACT TO BARE SKIN
CHECK ELECTRODE TRAY CONNECTION
CHILD MODE
KEEP ELBOWS STRAIGHT (CPR Tocks)
LEAN OVER THE PATIENT (CPR Tocks)
ONE (CPR Tocks)
PROVIDE TWO BREATHS (CPR Tocks)
PUSH DOWN DEEP (CPR Tocks)
PUSH DOWN HARD AT LEAST 2 INCHES (CPR Tocks)
REMEMBER TO PUSH DEEP (CPR Tocks)
REMEMBER TO PUSH HARD (CPR Tocks)
RESUME CHEST COMPRESSIONS (CPR Tocks)
THE HEEL OF ONE HAND SHOULD BE IN CENTER OF CHEST THE OTHER HAND ON TOP OF FIRST HAND (CPR Tocks)
TWO (CPR Tocks)
USE BODY WEIGHT TO PUSH (CPR Tocks)
YOU HAVE ONE MINUTE TO GO (CPR Tocks)
DELIVERING SHOCK
DO NOT TOUCH PATIENT
ENGLISH ("Language Name")
EVERYONE CLEAR
FOR "Language Name" PRESS THE LANGUAGE BUTTON ON THE LEFT
IF NOT BREATHING
LOOK AT PICTURES ON PADS
MOTION DETECTED; STOP MOTION
NO SHOCK ADVISED
PRESS FLASHING BUTTON
PRESS PADS FIRMLY
PROVIDE CHEST COMPRESSIONS TO THE BEAT
PULL RED HANDLE TO REVEAL PADS
REMOVE ALL CLOTHING FROM PATIENT'S CHEST
REPLACE BATTERY
RESUME CHEST COMPRESSIONS
SHOCK DELIVERED
SHOCK NOT DELIVERED
STOP CHEST COMPRESSIONS
cprINSIGHT_ANALYZING HEART RHYTHM
cprINSIGHT_DO NOT TOUCH PATIENT
cprINSIGHT_NO SHOCK ADVISED
cprINSIGHT_RESUME CHEST COMPRESSIONS
cprINSIGHT_STOP CHEST COMPRESSIONS |
| Tones |
| Shock Tone
Metronome Tock
Power On Beep
Service Alert
Thud Tone (Shock Delivery) |

| Device Options, Menus, Modes, Counters and Timers |  |
| --- | --- |
| Setup Options Table |  |
| Main Menu |  |
| Scenario # | 1/2/Demo/cprINSIGHT |
| Text Language | Text - 1 of 36 Languages |
| Primary Language | Voice Prompts (1 of 36) |
| Volum | Auto/1/2/3/4/5/6/7 |
| Battery Level | High/Med/Low |
| Bluetooth Status | On/Connected/Not Available |
| Bluetooth ID# | Dongle ID # |
| Software Version | Program and Voice Prompts |
| Scenario Menus 1-4 (Each x4) |  |
| Device/Shock Type | Semi-Auto/Fully-Auto Shock |
| # of Shock Events | 1/2/3/4/Repeat |
| Shock Advised | Y/N sequence for each Shock Event |
| CPR Ventilations | ON/OFF (Metronome 30:2/Hands Only) |
| CPR Time | 60 s/120 s/180 s/Short |
| CPR Filtering | ON/OFF (aka Rosetta/CPR Insight) |
| No-CPR Detected | ON/OFF |
| Motion Detection | ON/OFF |
| Bilingual | ON/OFF |
| Second Language | Voice Prompts (1 of 36) |
| Pulse Prompts | ON/OFF (aka Check Breathing) |
| Other Menus and Modes |  |
| Device Configuration | Training or Demonstration Mode (via Utility Menu) |
| Training Mode | Scenarios 1 and 2 only, without Bluetooth |
| Demonstration Mode | Scenarios 1-4, with Bluetooth |
| Voice Prompt Mode | Primary or Secondary Language (Lang 1 or 2) |
| Age Mode | Adult/Child |
| Counters/Timers |  |
| Event Counter (Shock/No Shock Counter)
CPR Cycle #: CPR Cycle Counter
CPR Timer:
Auto Shutoff Timer - 15 min.
Wake Up Display Timer - 5 min (uses Auto Shutoff timer)
Other State Timers - as specified |  |

The following sections describe additional details of an exemplary embodiment of a special purpose machine designed for training students in the use of a specific, target AED. As indicated, this special purpose machine is designed to closely resemble the physical appearance and feel of the target AED, although the functionality of the trainer will be quite different (e.g., the trainer will not deliver real electrical shocks). It is understood that the detailed physical construction of the trainer may be modified as necessary to resemble different target AEDs.

Special Purpose Hardware Platform

General features and characteristics of an illustrative embodiment of the inventive AED trainer include the following:

The device enclosure (housing) should match the size, shape, mechanical design, color and graphics of an actual or target AED with the following exception: The trainer preferably has one or more visible features such as color, graphics or text, which distinguishes it from the actual AED and indicates that it is a trainer and not for clinical use.

All controls, indicators and mechanical functions of the actual or target AED user interface will preferably be replicated.

The voice prompts match the AED voice prompts in audio volume and quality, and have the capacity for multiple languages and bilingual operating modes.

The operating states and software functionality will replicate all states and functionality found in the actual AED, including Adult and Pediatric operating modes. This functionality will preferably be limited to the user experienced states that are associated with a rescue event.

Simulated email alert notifications are provided to demonstrate the features and benefits of having a network-connected AED. The AED trainer has the capability to simulate specific automatic email alert notifications by wirelessly communicating with custom application software residing on a smartphone or tablet. For this purpose, and as an example, the AED trainer may be connected to the LIFENET® System, which is a cloud-based platform that enables care teams to work efficiently and share critical patient data to reduce time-to-treatment for patients.

Automatic volume control is provided in the AED trainer to replicate this AED feature in response to ambient noise levels.

The AED trainer includes an instructor accessible LCD Display for device setup. The display will preferably be located under the electrode tray and not visible during use. Setup of the device should be easy and have minimal steps so it can be completed quickly. There should be clear default configuration options to minimize setup time required before each use.

The AED trainer includes a fully functional and reusable electrode tray 126 that closely resembles the AED tray and can be easily, quickly and accurately repackaged.

The AED trainer preferably includes a simple means for end users to fully update the trainer device software. A USB flash drive is available that can be used to upgrade the device software.

The AED trainer is preferably a low voltage battery operated device that will not deliver energy.

A time based shutoff routine is provided to reduce battery consumption.

Exemplary features of the device housing and construction include the following:

The housing is constructed primarily of injection molded plastic components modeled upon the corresponding individual housing components of the actual or target AED. The external form closely matches the AED.

The lid 102 replicates the AED lid in form, fit and function including the closed-position latching, hinge torsional friction, stop position and break-away function.

Power, Pediatric and Language buttons will preferably be tactile style and incorporate hard plastic covers to match the external characteristics of their corresponding AED buttons. The Shock button may be a tactile elastomeric construction.

The AED trainer includes battery compartments on the bottom of the device each with a simple access door. Due to space restrictions, the illustrative embodiment includes three separate battery compartments instead of a single compartment that holds four batteries. Two will each hold one D-Cell battery, and one will hold two batteries. The compartment doors will preferably be secured in place by a molded snap in latch.

The electrode tray 126 should closely resemble the AED electrodes tray. It will preferably be constructed with a hard plastic base and tear-away cover with quick release pull-handle. The tray 126 will insert into the device housing in the same manner as the AED Tray. However, the construction and mechanics of the tear-away cover means will differ from that of the film and adhesive design of the AED cover in order to make the trainer cover and tray reusable. To accomplish this, the cover may be constructed of a thin molded silicone elastomer that will mechanically engage the perimeter of the tray using a tongue and groove principle.

The pad liners form and function will preferably be replicated and will cover the wire storage compartment just below. However, the liners may be constructed of molded plastic and affixed permanently to the tray 126 instead of a film/paper liner in order to provide an unlimited useful life without distortion or degradation. The liners closely mimic the behavior characteristics of the AED Liners, including the tilt-up through the use of an integral living hinge. Their design may accommodate pads-on-manikin detection switches and will utilize a resin proven compatible with the selected pads' adhesive.

The tray cover handle matches the appearance and form of the actual or target AED handle and will preferably be attached to the upper left corner of the tray cover. However, due to the difference in the tray cover materials and construction, the trainer handle will attach to the cover through a different mechanical means. The design should provide the required tear-away opening characteristics of the cover while also providing the longevity required for the reusable trainer tray.

Opportunities for other improvements that can reduce the cost of the tray or enhance training usage characteristics, such as ease of setup, longevity, wire management, etc., may be considered. Such improvements should preserve realistic appearance and deployment characteristics for demonstration. Likewise, the electrode plug and port connections may be modified on the tray in order to meet these objectives.

The post-training ease of use should be equally considered. The training electrode design should be quick, easy and intuitive to correctly reassemble between uses. The training electrodes should be designed to minimize the foreseeable scenarios that can cause damage to the device or electrodes.

The cable and plug closely resemble the appearance and physical characteristics of the AED cable and plug. The design of the plug contacts and mechanical plugging may differ to reduce costs so long as the appearance and functional characteristics remain similar. In no case should a trainer or demonstrator plug, or tray, engage or mate with an AED counterpart. The pad connectors will attach to the lower right corners utilizing a design that captures the pad from both above and below in conjunction with removable mechanical pin that passes through the connector and pad. The connectors will also incorporate electrical contacts required for the pads-on-manikin detection switch The electrode pads will preferably be a two-layer construction of white PE Foam top and a Silicone based adhesive base. Top-side color printed graphics will preferably be protected by a transparent poly-coating to maximize life and durability.

Exemplary inputs and controls include the following:

Power Button—Controls power ON/OFF functions of the device as well as the Pause function.

Lid Activation—Opening/closing of the lid 102 will control the device to start and end a training or demonstration scenario. Also enters the Ready/Not Ready state when lid 102 is closed.

Shock Button—Delivers the simulated shock.

Pediatric Button—Enters and exits Pediatric mode.

Language Button—Toggles between Primary and Secondary languages when bi-lingual is on.

Setup Buttons—Scroll Up, Scroll Down, Change Selection, Confirm. These are adjacent to Setup Display.

Wireless Inputs/USB Port—The AED trainer has a USB Port for add-on Bluetooth Wireless communications for demonstration purposes. USB Port may also support a device reprogramming flash drive.

Exemplary device outputs and voice prompts include:

Power On—Cylindrical flat top diffused green LED adjacent to Power button. LED On-Solid when device is on and flashing when paused. Visible through hole in lid 102 when the lid is closed.

Readiness Indicator—Flashes to indicate device Readiness.

Pediatric LED—Cylindrical flat top diffused green LED adjacent to Pediatric Button.

Illuminated Shock Button—Backlit translucent red molded elastomeric key. White Shock icon printed on red key.

Setup Display—A color LCD-TFT display located underneath the electrode tray.

Voice Prompts:

Synthesized Speech—The audio volume, clarity and quality of synthesized voice prompts will preferably be equivalent to that of the target AED. Voice Prompt data may be in the form of finished MP3 files.

MP3 Playback—The AED trainer compresses and decodes MP3 with playback up to 16 kHz.

Speaker—The AED trainer will utilize the same speaker found in the target AED in order to provide equivalent audio performance and quality.

Languages and Memory: A total of 36 languages are incorporated in the exemplary device. The device memory has a capacity of 1 Gigabit with each language expected to consume an average of 1.65 MB Gigabits. Each language will preferably be comprised of the same set of voice prompt phrases. Primary, Secondary and Text languages are set independently, with all localization combinations available.

All training and demonstration setup options are accessible through the Setup Menu in the LCD Display. The Menu includes a Main Menu screen containing global settings and status information, and two to four (depending on the model) sub-menu screens, one for each available training Scenario. The first two of the Scenarios are available on both the Training and Demonstrations modes of the device. The third and fourth Scenarios are intended for demonstration only. Four (4) setup control buttons positioned just below the LCD Display provide a means to navigate the Setup menus and change both device and individual Scenario settings. Each option has a name and a corresponding display field adjacent to the name indicating its current setting. Some settings are user changeable, and others will not be changeable. Settings that are changeable are displayed in black text, matching the rest of the screen text. Settings that are not changeable, including status indicators, are displayed in gray text. All Text information is displayed in the active Text Language. All changed settings are stored in memory and retained until they are changed again.

The four buttons below the display provide navigation by means of a cursor that displays itself as a negative (reverse) color image on the current text field. The cursor starts at the top of the screen in the Main Menu header cell just above the right column. The Up and Down Arrow buttons allow the user to scroll the cursor through the settings in the right column to reach the desired feature. When scrolling, the cursor will skip over the non-changeable settings shown in gray text. That is, the cursor will only stop on changeable settings. Once the cursor is on a desired setting, a selection of the Right Arrow (Change) will change the setting to the next available setting. Repeated Change selections will advance through all the available settings for that feature. A Right Arrow selection while on the last setting will return it back to the first setting. When the user has reached the desired setting, they can save and enter it in one of the ways; they can simply scroll up or down to the adjacent feature cell; or they can select the Check (Confirm) button, which will exit the Setup Menu and turn off the Display. Whenever the user is on Main Menu screen, a selection of the Confirm button will always exit the Setup Menu, save all settings, and turn off the Display.

The Scenario feature allows the user to select from up to four training and demonstration Scenarios; Scenario 1, Scenario 2, Demo, and "cprINSIGHT" Demonstration mode. Software configurations intended exclusively for training includes only Scenarios 1 and 2, whereas configurations also intended for demonstration includes all available Scenarios. Each Scenario has its own Sub-Menu screen that allows the user to independently customize feature settings under that Scenario. This Scenario setting on the Main Menu is only for the purpose of selecting which Scenario is currently active for the device. The default setting is Scenario 1.

The Primary Language input is used to select the primary voice prompt language for the device. The setting options include all the voice prompt languages by names that are programmed and available in the device. There may be different configurations of the device, each with a different language set. The default Primary Language of the first configuration is English. Options for Bilingual operation and associated Secondary Language voice prompts are set and controlled in the Scenarios Sub-Menus.

The Text Language input is used to set the Text Language for the entire Setup Menu. The Text for a new Language will change and update to the new when the user selects the Confirm button. The default Language is English.

Seven Volume settings and Automatic setting are available for the user to select from. The Automatic setting will adjust the volume automatically based upon the ambient noise level, starting at a level 2. The settings are designated with numbers 1 to 7 and "Auto" for the automatic setting. The default volume setting is Auto.

The Setup Sub-Menu screens include four Setup Menus, one for each of the four training and demonstration Scenarios; Scenario 1, Scenario 2, Demo, and cprINSIGHT Demo. Each Scenario Menu screen is formatted and navigated in the same manner as the Main Menu screen. The features will be listed in a column on the left side of the screen, and the current settings will be listed in a corresponding column on the right side of the screen.

The user can access the Sub-Menu Screens directly from the Main Menu simply by pressing the Change (Right Arrow) Button whenever the cursor is on the Main Menu header. Upon selection, the entire screen will change to the Scenario 1 Menu. The cursor will remain at the top of the screen in the Scenario 1 header. Another selection of the Change button will advance to the Scenario 2 screen, and so on. As long as the user leaves the cursor in the top header, they can cycle through all the menu screens returning to the Main Menu after the last Scenario Menu screen. The sequence of Scenario Menus will be: Scenario 1, Scenario 2, Demonstration, and cprINSIGHT Demonstration.

The Scenario Menus are navigated in the same manner as the Main Menu by using the scroll Down and Up buttons to move the cursor off the top header and into the settings column. The cursor will only stop on changeable settings and where the user can then press the Change button to cycle through the available settings. Once the user has configured their desired settings, they can exit a Scenario Menu by pressing the Check (Confirm) button. The Confirm button will always save the current settings and return the user to the Main Menu, with the cursor residing on the Main Menu Header. Further, that Confirm selection will also set the current Scenario to the Scenario they just exited from. That Scenario will now be displayed on the Main Menu. (Example: If the user presses Confirm to exit from the Scenario 2 Menu screen back to the Main Menu screen, the device will be set to Scenario 2.)

The Device Type feature determines the shock delivery method. Setting options are "Semi-Automatic" and "Fully Automatic". A Semi-Automatic setting will require the user to press the Shock button to deliver a simulated shock, whereas Fully Automatic will deliver shocks automatically.

The Number of Events input determines the number of analyses that will be available and occur in each Scenario. Available options are 1, 2, 3, 4 and Repeat. If a Scenario is set to 1, 2, 3, or 4, the scenario will automatically end and stop after the CPR cycle which follows the last analysis and shock/no-shock. If the device is set to Repeat, the scenario will not end until the user ends it manually. The analysis result for all subsequent cycles will always repeat the final ($4^{th}$) Event setting, whether it is Shock or No-Shock.

The Shock Advised option sets the Shock or No-Shock result for each analysis based upon the Number of Events available. The user will set either a "Yes" or "No" Setting for each analysis. A "Yes" setting programs a Shock, a "No" setting programs a No Shock Advised. The right column of the menu screen is divided into 4 sub-columns, one for each potential analysis.

The CPR Metronome option sets the type of CPR performed form one of two settings; "30:2" and "Hands Only". The 30:2 Settings will provide voice prompts for repeating cycles of 30 chest compressions followed by 2 rescue breaths. A Hands Only Setting will provide prompts for continuous chest compressions per minute with no rescue breaths. In either case, the Metronome sound is a continuous Tock delivered at a rate 104 per minute both within (behind) voice prompts and between prompts throughout the CPR periods.

The CPR Time option sets the duration of the CPR periods from one of four settings: "60 seconds", "120 seconds", "180 seconds" and "Short". The numeric Settings are simply the duration of the CPR cycle in seconds. A Short setting will end each CPR cycle prematurely, typically in less than 60 seconds, in order to advance through it in less time.

The cprINSIGHT option demonstrates the enhanced rhythm analysis features. Setting options are On" or "Off". When On, the device will simulate analysis during CPR and not prompt the user to stand back until a shock is advised. When a scenario reaches the end of a CPR cycle, and if the next rhythm Event is set to No-Shock, the scenario will skip the normal analysis sequence and will instead continue with another cycle of CPR. This setting will be On and unchangeable in the cprINSIGHT Demonstration Scenario.

The No-CPR Detected option simulates the device capability to detect if CPR is not being performed during a CPR cycle. Setting options are "On" and "Off". When set to On, the scenario will simulate the detection of no CPR being performed once during the first CPR period and provide adjusted prompts. The feature is strictly a simulation, as the device cannot detect whether CPR is being performed on the training manikin being used.

The Motion Detected option simulates patient motion detection during analysis. Setting options are "On" and "Off". When On, the device will deliver voice prompts to stop patient motion once during the first analysis of the scenario.

The Bilingual option determines if the trainer will operate like a bilingual configured device. Setting options are "On" and "Off". When set to On, the Bilingual button will be operable and a voice prompt in the second language will play at the beginning of a scenario. Selection of the button will immediately switch the voice prompts to the second language, set under the Second Language setting in the scenario menu, and will announce the name of that language. Subsequent selections of the Bilingual button will toggle the language back and forth between the Primary and Second Languages. Once a scenario has passed the "Pads-On" point in a scenario, the Bilingual button will become inoperable. If the Bilingual button is pressed when it is configured to "Off", a voice prompt will state the selected primary language.

The Second Language option determines the second set of voice prompts and works in conjunction with the Bilingual feature. The setting options include the same voice prompt languages that are available in the device for the Primary Language setting. If the Bilingual option is set to "Off", the Second Language setting cell on the Display will be blank instead of displaying the most recent language setting. However, that setting will be retained in memory, and will return to the display cell whenever the Bilingual setting is returned to "On".

The Check Breathing options determine whether check for breathing prompts are delivered prior to CPR following any No-Shock advised analysis. Setting options are "On" and "Off".

To save power, the display backlight has a 5-minute automatic shutoff. If five minutes have elapsed with no device input, the display backlight will turn off. The user can wake the display by pressing any Setup Button and then resume normal setup operation. This timeout is separate and distinct from the automatic device shutoff timer. After 10 additional minutes of inactivity with the display off, the whole device will turn off following the automatic shut off routine. At this point, the trainer/setup menu can be turned ON with the power button.

The AED trainer, for example, can be configured via a setup mode enabling flexible training and demonstration scenarios. The following features are available in the setup mode of the illustrative embodiment:

Auto Enter Setup: The AED trainer automatically detects when electrode tray is removed and enters setup mode by stopping the scenario and turning on the setup screen.

Setup Screen: The AED trainer has a setup screen that allows the users to see all current settings for trainer and training scenario. It also has navigation and selection inputs to uniquely configure the trainer. Information can be displayed in localized text, graphically or with symbols, with supplemental audible tones and voice prompts.

Quick Run: Setup mode has a "quick run" check confirmation button that allows the user to select and run the currently highlighted scenario for faster setup.

Settings: All of the below options are visible or configurable through setup mode:
 Selected scenario
 Text Language
 Voice Prompt Language
 Volume
 Battery Level
 Bluetooth Connectivity Status
 Bluetooth Serial Number
 Software Version
 Fully Automatic vs Semi-Automatic
 # of Shock Analysis Events
 Shock Advised
 CPR Metronome with or without Ventilations
 CPR Time
 CPR Detection
 Motion Detection
 Bilingual
 Secondary Voice Prompt Language
 Check Breathing Screen Text Language: All text presented in the setup menu is localized. That text can be immediately updated and changed.

Languages: All text and prompt languages are available in the same trainer. Use has the ability to select any language or language combination and the trainer will automatically operate in the new language.

Auto Volume: The AED trainer has an "Auto" volume setting that uses a microphone to detect ambient environment and adjust the volume of voice prompts in the trainer up and down based on that environment.

Battery Status: The AED trainer can detect the hours remaining and hours used of trainer battery status. Battery status can be communicated as static or a dynamic range in text, icon, coloration or symbol graphic. Trainer notifies user with a verbal "Replace battery" prompt at each power down when trainer is in the Low battery status.

Bluetooth Serial Number: The AED trainer detects the unique identifier on the Bluetooth USB adapter and displays it on the screen.

Bluetooth Status: The AED trainer knows and displays status of Bluetooth as present, actively connected via Bluetooth to a smart device, or not connected. Status can be communicated as static or a dynamic range in text, icon, coloration or symbol graphic.

# of Shock Analysis Events: The AED trainer can be configured to run a set number of events and then end the scenario. This also includes a Repeat setting to repeat the last defined shock analysis until the trainer is actively turned off.

The AED trainer dynamically sends automatic signals ultimately resulting in wirelessly notifying a user. This real-time connectivity feature demonstrates the value of connectivity available on new AEDs. Signals from the AED trainer include the following:
 Trainer unique identifier
 Trainer ready
 Trainer not ready
 Bluetooth available
 Bluetooth not available
 Power On
 Lid Opened
 Pad 1 removed from storage
 Pad 2 removed from storage
 Pad 1 placed
 Pad 2 placed
 Shock delivered
 Scenario ended
 Report at end of scenario with time stamped activities The connectivity implementation options include options for signals sent from the AED trainer, options for signals received by the AED trainer and providing user notifications. For example, options for sending signals from the AED trainer include inserting a Bluetooth USB adapter into the trainer to send signals via Bluetooth, and implementing connectivity technology such a wireless antenna cellular antenna or Bluetooth in the trainer.

Options for receiving signals from the AED trainer and sending notifications to a user include: (1) employing an application on a smart device that operates via Bluetooth to receive signals and directly notify users through smart device technology such as integrated email; (2) employing an application on a smart device that operates via Bluetooth to receive signals and send them to a cloud-based system that notifies users; (3) employing a computer to receive signals via wireless and directly notify users through smart device technology such as integrated email; and (4) employing a computer to receive signals via wireless and send signals to a cloud-based system that notifies users.

User notification options include smart device app notification, SMS, email, and providing account updates via an online device management system. If the user views his information in the online system, he will see the status of the device updated based on dynamic information received from the trainer.

A smart device app for use with the inventive AED trainer will preferably provide two-way communications in receiving signals from the trainer and providing inputs to the trainer. Example AED trainer inputs provided by the smart device app include the following:
 1. Pause scenario
 2. Simulate motion detected
 3. Simulate no CPR being performed
 4. Simulate CPR not at correct rate, depth or recoil
 5. Change language
 6. Change scenario selected or scenario settings (including semi vs fully automatic, shock advised vs no shock advised, number of shocks, CPR metronome configuration and CPR time)
 7. Simulate trainer ready state
 8. Simulate trainer not ready state
 9. Change volume
 10. Display real time battery status
 11. Display real time connectivity status
 12. Update trainer software Another function of a smart device app for use with the inventive AED trainer will be to collect additional information to combine with automatic signals from the trainer and include in user notifications. Examples include (1) language of notification, (2) users to receive notification and information such as email, online account, phone number, etc., and (3) simulated name of account.

Yet another function of a smart device app designed for use with the AED trainer is the ability to trigger notifications manually in the app in addition to automatic signals from the trainer. Examples of such notifications include:

1. Simulate supplies expiring
2. Simulate software update available
3. Simulate device failed self-test
4. Simulate ready status
5. Simulate not ready status In the exemplary embodiment, the AED trainer can be configured separately for demonstrations (as opposed to CPR/AED training). In this embodiment, the default settings are automatically changed by switching between demonstration and trainer configurations. Additional information and setting options are available based on the configuration. Additional scenarios are also available based on the configuration, and device features are enabled or disabled based on the configuration.

In the exemplary embodiment, the AED trainer has a hold state followed by an automatic shutoff to demonstrate readiness and conserve battery.

1. Dynamic Readiness: The AED trainer demonstrates readiness when packaged correctly (with the electrode tray in place) by imitating the readiness indicator of the corresponding AED including a flashing LED. The AED trainer demonstrates a not ready scenario when the electrode connection is broken (tray is removed, disconnected, or plug is disconnected) and the lid is closed including the LED off and an audible alert.

2. Sleep State: After a short preset tine with no activity the trainer can sleep, essentially an automatic pause mode to conserve power, but will restart from the same point with any activity.

3. Auto-Shutoff: After a preset time with no activity in any state (ready, not ready, setup mode, or use) the trainer will automatically shutoff to conserve battery. Auto-Shutoff can be disabled when certain setting parameters are met, such as when "Repeat" is selected on # of events or the trainer is actively connected to an application to send wireless signals.

Operating Features and Functionality

Power-Up Conditions and Readiness State—If the device is in an OFF state, opening the lid 102 will turn it On. If the device happens to be in an OFF state with the lid 102 opened, selection of the Power button will also turn on the unit. In either case, the lid 102 may be closed and the device will return to a READINESS state. Readiness is a pseudo-off state that replicates the Standby state of an AED in which a Power LED flashes once every 6 seconds to indicate the device has passed all self-test and is ready for use. The flashing Power LED is will be visible through a hole in the lid. Whenever the device is in a READINESS state, it will remain there until it shuts off as a result of an automatic shutoff timer, or the lid 102 is opened to start a scenario. The device may be turned OFF at any time by pressing the Power button down for more than three (3) seconds. If the Power button is pressed for less than 3 seconds during a scenario, the device will instead enter a Pause state.

Power LED—The Power LED will be on solid whenever the device is "on" during an active training Scenario. The Power LED will flash 0.75 s on/0.25 s off whenever the device is in a Pause state. The Power LED will flash once every 6 seconds whenever the device is in a READINESS state. The Power LED will be off whenever the device is in an OFF state.

Self-Test Fault—If the device is Readiness mode and the electrode tray 126 is not in present, or the Electrode plug is not connected, it will simulate a self-test fault condition. The device will deliver an audio service alert with 3 beeps when lid is closed and another 3 beeps after 15 minutes, before the automatic shutdown. This beep replaces the normal flashing the Power LED, which will be off in this case.

Automatic Shutoff—Whenever the device enters any ON state, including Readiness, it will commence a 15 minute Automatic Shutoff countdown timer. Any and all device inputs that occur during any ON state, including user input, voice prompts, state change, etc., will always reset and restart the shutoff timer. When the timer reaches zero, the device will shut off. Auto shutoff is disabled when "Repeat" is selected for the number of events and when the trainer is actively connected to a smart device so the BT Status says "Connected."

Pause—A Pause function is provided through the Power Button. A selection that is less than 3 seconds during any training scenario "on" state will pause the device. A subsequent selection will exit Pause and resume the scenario at the previous point. A selection of 3 seconds or more during Pause will also turn OFF the device as it normally would. If the lid 102 is closed during Pause state, the device will exit Pause and return to READINESS state. The user may also exit Pause and enter Setup simply by pressing one of the Setup buttons. Doing so will end the training Scenario. If the tray is removed while in a pause state but no setup buttons are pushed, the same training scenario will resume once pause is lifted.

Language—When the lid 102 is opened and a Scenario commences, it will begin voice prompts and operation using the Primary Language setting. If the Bilingual Setting is "ON", the Language button can be selected at any time prior to detection of pads-On and it will immediately switch the voice prompts to the Second Language setting. The device will deliver a voice prompt announcing the name of the Second Language and then continue with normal operation. The Language button may be selected repeatedly to toggle between the Primary and Second languages. Once the pads-On manikin state has been determined, any Language button inputs will be ignored. If the Bilingual setting is OFF and the button is pushed, a voice prompt will state the name of the primary language, and only the Primary Language voice prompts can be used.

Start and End Scenarios—Each time the device is turned "on" via opening of the lid 102 it will start at the begging of the currently selected Scenario. The device will always progress through a series of sequential states including patient assessment, applying electrode pads, analysis, no-shock advised or shock delivery, and CPR. Various alternate states may also be entered based upon setup options or user actions during the scenario. When the device reaches the end of any Training Scenario, being the completion of the final CPR cycle, the device will automatically end the scenario and return to a Readiness State. The number of CPR cycles will equal the Number of Events setting (1-4). If however, the setting is on Repeat, the user will have to end the Scenario manually by closing the lid 102 or using the Power button.

Adult/Pediatric Modes—The device will start any Scenario in Adult mode. The Pediatric (Child) button can be selected before pads-On manikin detection to change to Pediatric mode. Upon entry into Pediatric mode the Pediatric LED will illuminate and the voice prompts will indicate Pediatric Mode. If the Pediatric button is selected a $2^{nd}$ time, the device will immediately exit Pediatric mode and resume Adult mode. The Pediatric button may be selected repeatedly to toggle between Adult and Child modes. Once the pads-On has been detected, further Pediatric button inputs will be ignored. Pediatric mode provides different voice prompts for CPR states. Device functions are otherwise the same for Adult and Pediatric modes.

Electrodes Tray and pads—Although the trainer electrode tray 126 will differ from the AED tray in order to be reusable, it will function in a manner that is essentially the same, including a quick release pull-handle, Electrode pad pull-rings, electrode liners, and the wire storage compartment. The AED trainer's electrode tray 126 will be removable from the trainer to demonstrate how the electrodes are replaced on the AED. The tray 126 will load and snap into the trainer in the same manner as the AED Tray.

Disposable Electrode pads and connectors—The Electrode Training pads will attach to the Electrode plug and Wire assembly by means of a plastic connector at the end of each Wire. The connector allows the user to disconnect worn out pads and dispose of them while reusing the plug and Wire assembly. The plastic connectors will attach onto the lower right corner of the pads using a slot that that captures the corners of the pad from above and below. The corner of the pad will be secured in place with a custom plastic dowel pin that passes through both layers of the connector and the pad. The user simply presses the Pin into a receiving hole using their finger. Removal is done by pressing form the bottom side using a similar action with the fingertip or the tip of an everyday object such as a pen. The connectors will have a smooth and relatively thin profile so that they do not cause the user any discomfort during CPR if their hands happen to be positioned on top of the connectors.

Electrode Tray and plug Detection—The AED trainer will monitor for the presence of the Electrode plug in the Electrode Port during any training or demonstration scenario. Because of the Tray's mechanical construction, whenever the tray 126 is removed from the housing, the plug will be necessarily removed too. However, the plug can be removed without removing the Tray. If the Tray/Plug is not present while the device is in READINESS state with the lid 102 closed, the device will enter an "electrodes fault" condition and appropriate indications will be delivered. A service alert of 3 beeps will play when lid is closed and another 3 beeps after 15 minutes, before the automatic shutdown. Whenever the device is actively connected to a smart device via Bluetooth, this fault will also be transmitted for network simulation. For setup convenience, whenever Tray/Plug is removed during a scenario the Setup Display will wake up to display the Main Menu and end the training scenario to enter setup mode. Anytime the device is in an OFF or READINESS state with plug/Tray out, opening the lid 102 take the user directly into the Setup mode instead of starting a scenario.

Shock Advised and No-Shock—The AED trainer will read and follow the sequential Shock Advised settings under the current Scenario. Whenever the device enters an Analysis state, it will utilize the next simulated rhythm (Shock Advised=Yes or No Shock Advised=No) that immediately follows the previously completed rhythm setting. The analysis state will be considered complete once the simulated Shock has been delivered, or once the No-Shock Advised prompt has been issued. The entire Shock Advised sequence will be considered complete and will reset to its beginning whenever the device returns to a Readiness or OFF state thereby ending the scenario. Prompts to deliver a Shock, or prompts for a pending automatic Shock, will always be accompanied by the flashing of the Shock Button and a ready to shock tone. The button will cease flashing immediately upon delivery of the Shock and play the trainer-specific shock delivered sound.

Integrated Training

In the exemplary embodiment, the AED trainer has the ability to communicate with a CPR device to provide integrated training solutions. The AED trainer and CPR device can communicate 2-way via integrated/modular/adapter wireless technology such as Bluetooth, WiFi, and cellular. They can also communicate via a physical connection such as a USB adapter cable. The CPR device could include a standalone, modular or integrated CPR technology that monitors user CPR performance such as rate, depth, hands on time, number of pauses, pause duration, recoil, number of ventilations, and force of ventilations. The CPR device and trainer both know real-time CPR and trainer user performance and can provide real-time feedback via prompting, graphical/text displays, icons, or lighting based on that performance.

Information of user performance with the trainer and CPR device can be integrated into a dynamic time stamped post-use event report. Such a report could include the following:

1. User opening or exposing electrodes
2. User placing first electrode
3. User placing second electrode
4. Trainer indicating deliver first and subsequent shocks
5. User actually delivering first and subsequent shocks (if user generated via semi-automatic configuration)
6. Trainer or CPR device indicating start CPR
7. User actually initiating CPR
8. User CPR metrics for both hands only and a ventilation ratio such as rate, depth, hands on time, number of pauses, pause duration, recoil, number of ventilations and force of ventilations.

All user actions can be represented as time/date stamped, time from end of previous action to start of current action, and cumulative response time to current action. The report can compare user performance to guidelines, industry, or user-configured benchmark for actual performance metrics. The report could be generated via communication from either the AED trainer or CPR device to a third location such as a computer or smart device (e.g., phone or tablet). A computer or smart device could be programmed to generate the report. Alternatively, a cloud-based/online program could be used to generate the report.

LIFENET® System Simulation Features and Functions

Overview—One of the main purposes of the Demonstration version of the device is to simulate connectivity between the AED trainer and the network (e.g., the LIFENET® System mentioned above). In addition to including demonstration Scenarios 3 and 4, a Demonstration version of the device will include a Bluetooth USB Dongle. The Dongle will allow the user to communicate wirelessly via Bluetooth with smartphone and Tablet Devices that are running the AED trainer Demonstration App. The app simulates the LIFENET® server to automatically trigger email alert notifications in response to certain status outputs provided from the AED trainer via Bluetooth during a scenario. The Bluetooth Dongle and status outputs will work the same for any of the four available Scenarios.

Bluetooth Setup and Connections: Setup on the AED trainer requires that the Bluetooth Dongle has been inserted into the USB port on the bottom of the unit and that the AED trainer is on. The rest of the Setup and connection process may be completed using the smartphone device. Bluetooth status of the AED trainer is displayed on the Main Menu. If a Bluetooth Dongle is not present, the display will show "Not Available" on the Bluetooth Status line. If a Dongle is present but not yet connected to a smartphone, the display will show "On". Once connected, the display will change from "On" to "Connected". The Bluetooth ID line will also show "Not Available" whenever the Status line shows "Not Available". When the Status line shows "On" or "Connected", the ID line will show the unique serial number of the Bluetooth Dongle. That serial number is also printed on the Dongle itself and will be the device name broadcasted over Bluetooth. Once connected, the pairing of an AED trainer and a smartphone device becomes an exclusive connection where that AED trainer will remain connected to that smartphone device until either device is turned off or the connection is broken. Ending a scenario and returning to Readiness mode does not constitute turning off of the AED trainer, and the Bluetooth connection will be retained for repeated scenarios. Whenever a connected device is turned off and then back on, the connection will have been broken and the setup process much be repeated. Whenever a Bluetooth Dongle is present in the AED trainer, it will continue to advertise itself for potential smartphone connection as long as the AED trainer remains on. The user may terminate the connection from the app without having to turn off the AED trainer.

LIFENET® System Simulation and AED trainer Outputs: When connected, the AED trainer will provide the following Bluetooth outputs to the smartphone app:

Connection Confirmation—Confirmation of app connection.

AED trainer In Readiness State (All self-tests passed and device ready)—Each time the device enters Readiness state by closing the AED trainer lid with self-test Passed (Plug In) condition. This output is also provided whenever the device changes from self-test Failed condition to a self-test Passed condition while in Readiness state (Plug In to Plug Out).

AED trainer In Readiness State with Failed Self-Test (Example: Electrodes Tray/Plug not present)—Each time the device enters Readiness state by closing the AED trainer lid with self-test Failed (Plug Out) condition. This output is also provided whenever the device changes from self-test Passed condition to a self-test Failed condition while in Readiness state (Plug In to Plug Out).

Lid Was Opened—Whenever the Lid is opened to start the beginning of a scenario.

Electrodes Pads Connected—When pad placement is first detected and the AED trainer exits "Place Pads" state.

Conclusion

The true scope the present invention is not limited to the illustrative or exemplary embodiments disclosed herein. As will be understood by those skilled in the art, many of the inventive features described herein are based on a state machine, implemented with software, running on a special purpose hardware platform designed to replicate functional features of a particular AED. These functional features may be different for different types of AED, and may be revised over time. Therefore the functional counterparts in the AED trainer could similarly be changed without departing from the invention. Moreover, other embodiments within the scope of protection of the following claims include combinations and sub-combinations of features described or shown in the drawings herein, including for example, embodiments that are equivalent to: providing or applying a feature in a different order than in a described embodiment, extracting an individual feature from one embodiment and inserting such feature into another embodiment; removing one or more features from an embodiment; or both removing one or more features from an embodiment and adding one or more features extracted from one or more other embodiments, while providing the advantages of the features incorporated in such combinations and sub-combinations. As used in this paragraph, feature or features can refer to the structures and/or functions of an apparatus, article of manufacture or system, and/or the steps, acts, or modalities of a method.

We claim:

1. An automated external defibrillator (AED) trainer for training a student to perform an emergency rescue procedure, the AED trainer comprising:
    a hardware platform and state machine which together simulate the appearance and operations of an AED;
    a display;
    a user interface provided on the display, wherein a configuration option of the AED trainer is configurable through user interface elements of the user interface;
    a speaker through which the AED trainer is configured to instruct the student, by way of voice prompts, in performing a simulated rescue procedure on a manikin, wherein the voice prompts are based on the configuration option; and
    a communication interface configured to communicate a status output indicative of a status of the AED trainer to a computing device.

2. The AED trainer of claim 1, wherein the AED trainer is configured to perform a self-test upon entering a readiness state, and wherein the status output is indicative of a result of the self-test.

3. The AED trainer of claim 2, wherein the AED trainer further comprises a lid, wherein the AED trainer is configured to detect a closing of the lid, and wherein entering the readiness state comprises detecting the closing of the lid.

4. The AED trainer of claim 3, wherein the AED trainer further comprises an electrode tray, wherein the AED trainer is configured to detect a presence of the electrode tray, and wherein performing the self-test comprises determining whether the electrode tray is present.

5. The AED trainer of claim 3, wherein the AED trainer further comprises an electrode plug and an electrode port, wherein the AED trainer is configured to detect whether the electrode plug is connected to the electrode port, and wherein performing the self-test comprises determining whether the electrode plug is connected to the electrode port.

6. The AED trainer of claim 1, wherein the AED trainer further comprises a lid, wherein the AED trainer is configured to detect an opening of the lid, and wherein the status output is indicative of the opening of the lid.

7. The AED trainer of claim 1, wherein the AED trainer further comprises electrode pads, wherein the AED trainer is configured to detect a placing of the electrode pads on the manikin, and wherein the status output is indicative of the placing of the electrode pads on the manikin.

8. The AED trainer of claim 1, wherein the configuration option comprises a selection of a language for the voice prompts.

9. The AED trainer of claim 1, wherein the configuration option comprises a selection of an adult mode of operation or a child mode of operation.

10. A system for training a student to perform an emergency rescue procedure, the system comprising:
    a computing device; and
    an automated external defibrillator (AED) trainer comprising a hardware platform, a state machine, and a communication interface, wherein the hardware platform and the state machine together simulate the appearance and operations of an AED, and wherein the AED trainer is configured to communicate with the computing device by way of the communication interface, wherein the AED trainer is configured to instruct the student in performing a simulated rescue procedure on a manikin, and wherein the computing device is configured to communicate to the AED trainer an AED trainer input for controlling the simulated rescue procedure.

11. The system of claim 10, wherein the AED trainer input comprises a pause scenario input, and wherein reception of the pause scenario input by the AED trainer causes the AED trainer to pause the simulated rescue procedure.

12. The system of claim 10, wherein the AED trainer input comprises a change-scenario-setting input, and wherein reception of the change-scenario-setting input by the AED trainer causes the AED trainer to change a scenario setting of the simulated rescue procedure.

13. The system of claim 10, wherein the computing device is configured to execute an application through which a user-notification setting is obtained, and wherein the AED trainer is configured to output a user notification in accordance with the user-notification setting.

14. The system of claim 10, wherein the AED trainer is configured to wirelessly communicate a status output indicative of a status of the AED trainer to the computing device.

15. The system of claim 14, wherein the AED trainer is configured to perform a self-test upon entering a readiness state, and wherein the status output is indicative of a result of the self-test.

16. An automated external defibrillator (AED) trainer for training a student to perform an emergency rescue procedure, the AED trainer comprising:

a hardware platform and state machine which together simulate the appearance and operations of an AED;

an electrode tray;

a display located underneath the electrode tray;

a user interface provided on the display, wherein a configuration option of the AED trainer is configurable through use of the user interface; and a speaker through which the AED trainer is configured to instruct the student, by way of voice prompts, in performing a simulated rescue procedure on a manikin, wherein the voice prompts are based on the configuration option.

17. The AED trainer of claim 16, wherein the configuration option comprises a selection of a language for the voice prompts.

18. The AED trainer of claim 16, wherein the configuration option comprises a selection of an adult mode of operation or a child mode of operation.

19. The AED trainer of claim 16, further comprising a wireless communication interface through which the AED trainer is configured to provide real-time data outputs to a computing device, wherein the real-time data outputs relate to actions of the AED trainer.

20. The AED trainer of claim 19, wherein the wireless communication interface comprises a removable wireless communication interface that is removably connected to a communication port of the AED trainer.

* * * * *